(12) United States Patent
Kawahito

(10) Patent No.: US 12,140,677 B2
(45) Date of Patent: Nov. 12, 2024

(54) PSEUDO RANDOM NUMBER PULSE CONTROL FOR DISTANCE MEASUREMENT

(71) Applicant: NATIONAL UNIVERSITY CORPORATION SHIZUOKA UNIVERSITY, Shizuoka (JP)

(72) Inventor: Shoji Kawahito, Hamamatsu (JP)

(73) Assignee: NATIONAL UNIVERSITY CORPORATION SHIZUOKA UNIVERSITY (JP)

( * ) Notice: Subject to any disclaimer, the term of this patent is extended or adjusted under 35 U.S.C. 154(b) by 455 days.

(21) Appl. No.: 17/422,775

(22) PCT Filed: Jan. 10, 2020

(86) PCT No.: PCT/JP2020/000754
§ 371 (c)(1),
(2) Date: Jul. 14, 2021

(87) PCT Pub. No.: WO2020/149243
PCT Pub. Date: Jul. 23, 2020

(65) Prior Publication Data
US 2022/0075070 A1 Mar. 10, 2022

(30) Foreign Application Priority Data
Jan. 15, 2019 (JP) ................... 2019-004317

(51) Int. Cl.
*G01S 17/894* (2020.01)
*G01S 7/484* (2006.01)
(Continued)

(52) U.S. Cl.
CPC ............ *G01S 17/894* (2020.01); *G01S 7/484* (2013.01); *G01S 7/4865* (2013.01);
(Continued)

(58) Field of Classification Search
CPC ....... H04N 25/75; G01S 7/484; G01S 7/4865; G01S 7/495; G01S 15/10; G01S 15/102
See application file for complete search history.

(56) References Cited

U.S. PATENT DOCUMENTS 7,405,812 B1 7/2008 Bamji ............................ 356/5.1
10,754,033 B2 * 8/2020 Shand ..................... G01S 17/10
(Continued)

FOREIGN PATENT DOCUMENTS

CN  107533128 A  1/2018
CN  108431629 A  8/2018
(Continued)

OTHER PUBLICATIONS

Extended European Search Report dated Sep. 2, 2022 in counterpart European Application No. 20741217.2.
(Continued)

*Primary Examiner* — Rebecca C Bryant
(74) *Attorney, Agent, or Firm* — OSTROLENK FABER LLP

(57) ABSTRACT

A distance image sensor includes a light source that generates pulsed light, a light source controller that controls the light source, a pixel circuit including a photoelectric conversion region, charge readout regions, and control electrodes, a charge transfer controller that sequentially applies control pulses to the control electrodes, a signal readout circuit that reads out detection signals of an amount of charge transferred to the charge readout regions and a distance calculator that repeatedly calculates a distance from a difference value between two amounts of charge on the basis of the signals, the light source controller changes generation timing of the pulsed light according to a pseudo random number, and the charge transfer controller changes timings of the application of two control pulses for transferring charge corresponding to the two amounts of charge according to the pseudo random number so that the timings are replaced with each other.

8 Claims, 15 Drawing Sheets

(51) Int. Cl.
  *G01S 7/4865*   (2020.01)
  *G01S 13/78*    (2006.01)
  *G01S 15/10*    (2006.01)
  *H04N 25/705*   (2023.01)
  *H04N 25/75*    (2023.01)

(52) U.S. Cl.
  CPC ............ *G01S 13/785* (2013.01); *G01S 15/10* (2013.01); *H04N 25/705* (2023.01); *H04N 25/75* (2023.01)

(56) References Cited

U.S. PATENT DOCUMENTS

| | | | |
|---|---|---|---|
| 10,983,212 B2 * | 4/2021 | Takemoto | ............... G01S 7/484 |
| 2018/0081033 A1 | 3/2018 | Demirtas et al. | |

FOREIGN PATENT DOCUMENTS

| | | |
|---|---|---|
| CN | 109116331 A | 1/2019 |
| JP | S48-090554 A | 11/1973 |
| JP | 2013-076645 A | 4/2013 |
| JP | 2015-215181 A | 12/2015 |
| JP | WO 2017/110418 A1 | 6/2017 |
| JP | 2017-191042 A | 10/2017 |
| JP | 2018-059831 A | 4/2018 |
| WO | WO 2018/101262 A1 | 6/2018 |
| WO | WO-2020000755 A1 * | 1/2020 ............. G01S 17/10 |

OTHER PUBLICATIONS

International Search Report mailed Mar. 17, 2020 in corresponding International Application No. PCT/JP2020/000754.

English Translation of the International Preliminary Report on Patentability (IPRP) mailed Jul. 15, 2021 with a Notification from the International Bureau (Form PCT/IB/338) in corresponding PCT International Application No. PCT/JP2020/000754.

* cited by examiner

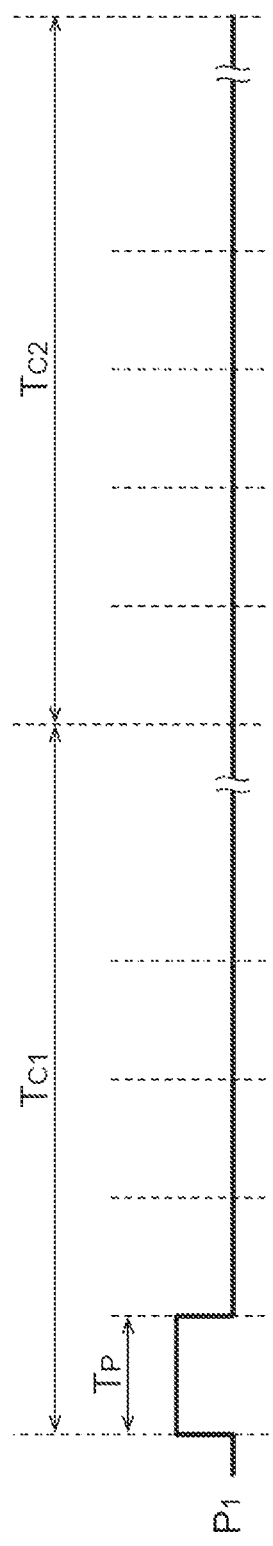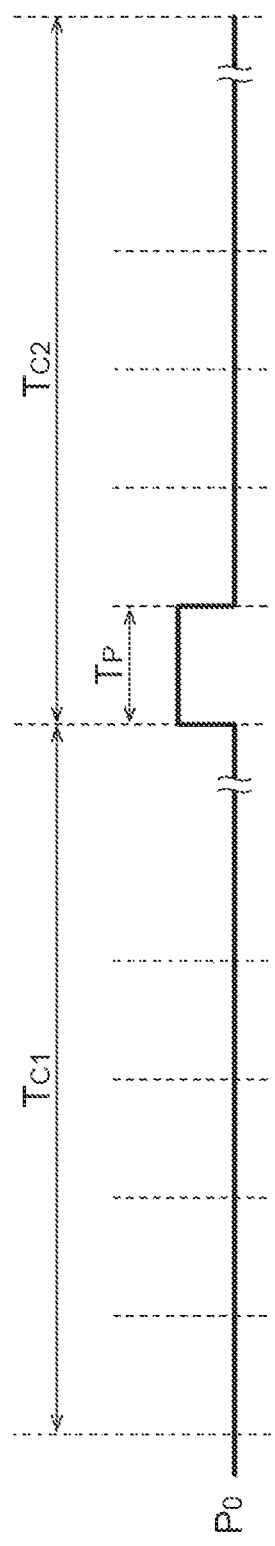
Fig. 6(a)
Fig. 6(b)

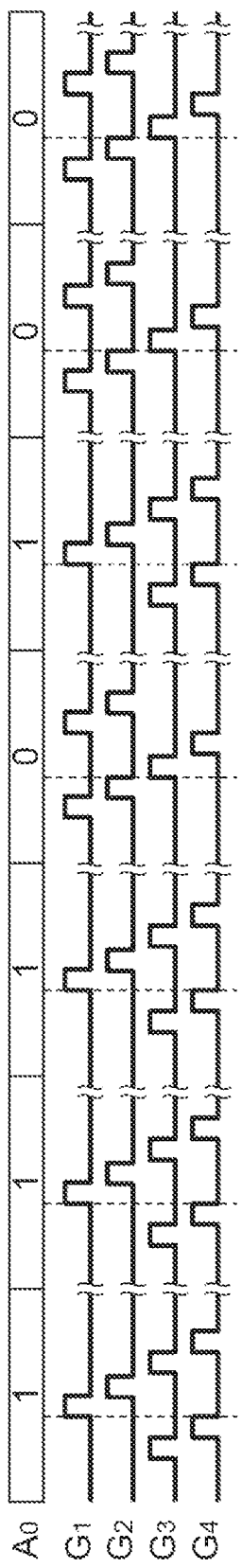
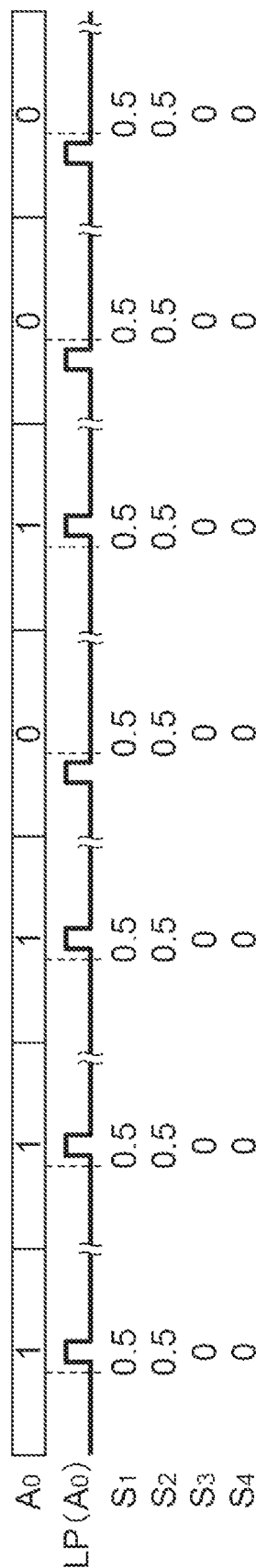
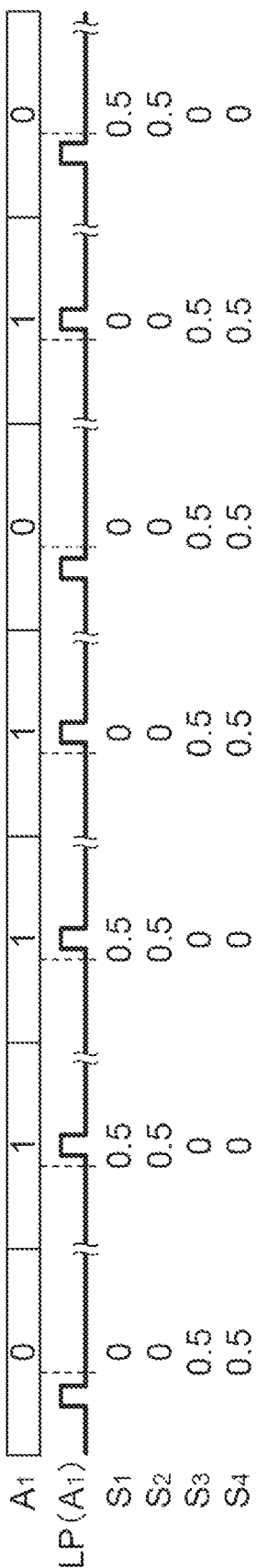
Fig. 12(a)
Fig. 12(b)
Fig. 12(c)

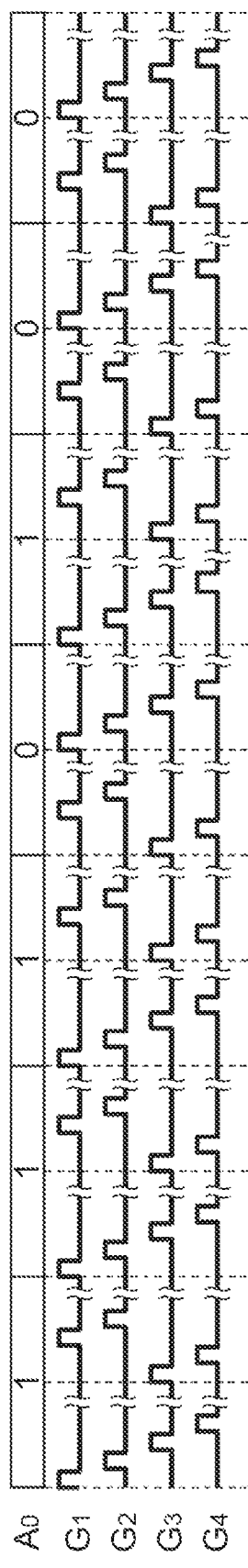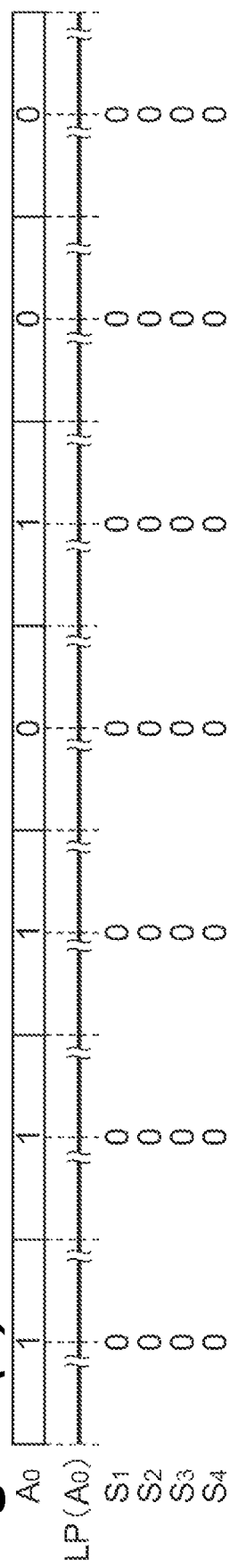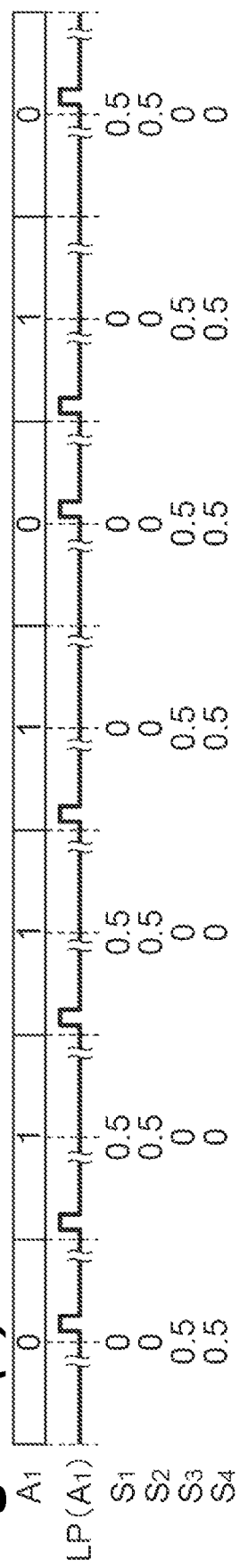

PSEUDO RANDOM NUMBER PULSE CONTROL FOR DISTANCE MEASUREMENT

CROSS-REFERENCE TO RELATED APPLICATIONS

The present application is a 35 U.S.C. §§ 371 national phase conversion of International Application No. PCT/JP2020/000754, filed Jan. 10, 2020, which claims priority to Japanese Patent Application No. 2019-004317, filed Jan. 15, 2019, the contents of both of which are incorporated herein by reference. The PCT International Application was published in the Japanese language.

TECHNICAL FIELD

An aspect of the present invention relates to a distance image measurement device, a distance image measurement system, and a distance image measurement method for generating a distance image including distance information for individual pixels.

BACKGROUND ART

In the related art, a device that generates an image signal including distance information using a time of flight of light has been used (see, for example, Patent Literatures 1 and 2 below). A device described in Patent Literature 1 below keeps an emission period of modulated light radiated from a light source and a charge accumulation period in each of unit storage units of a charge storage unit constant, and controls light emission and accumulation so that a length of a cycle is changed for each modulation cycle. Further, a device described in Patent Literature 2 below includes a light source unit and a light receiving unit, and a timing at which the light source unit and the light receiving unit are operated is changed at random in a storage cycle that is a cycle at which the light receiving unit accumulates an amount of received light according to emission of light by the light source unit.

CITATION LIST

Patent Literature

[Patent Literature 1] Japanese Unexamined Patent Publication No. 2013-76645
[Patent Literature 2] Japanese Unexamined Patent Publication No. 2017-191042

SUMMARY OF INVENTION

Technical Problem

However, in the devices of the related art described above, there is room for improvement in order to further improve measurement accuracy when a plurality of devices are used at the same time.

An aspect of the present invention has been made in view of the above problem, and an object of the present invention is to provide a distance image measurement device, a distance image measurement system, and a distance image measurement method capable of generating an image signal with sufficiently improved measurement accuracy when a plurality of devices are used at the same time.

Solution to Problem

In order to solve the above problem, a distance image measurement device according to an embodiment of the present invention includes a light source configured to generate pulsed light; a light source control means configured to control the light source so that the pulsed light having a first duration is repeatedly generated within a periodic frame period; a pixel circuit unit including a photoelectric conversion region configured to convert light into charge, first to M-th charge readout regions (M is an integer equal to or greater than 2) provided to be close to the photoelectric conversion region and separated from each other, and first to M-th control electrodes provided in correspondence with the photoelectric conversion region and the first to M-th charge readout regions and for applying first to M-th control pulses for charge transfer between the photoelectric conversion region and the first to M-th charge readout regions; a charge transfer control means configured to sequentially apply the first to M-th control pulses to the first to M-th control electrodes only for a second duration within the frame period in correspondence with the generation of the pulsed light by the light source control means; a signal readout means configured to read out a detection signal according to first to M-th amounts of charge, the first to M-th amounts of charge being amounts of charge transferred to the first to M-th charge readout regions of the pixel circuit unit according to the application of the first to M-th control pulses by the charge transfer control means; a distance calculation means configured to repeatedly calculate a distance from a difference value between two of the first to M-th amounts of charge on the basis of the detection signal; and a pseudo random number generation means configured to generate a pseudo random number, wherein the light source control means changes a generation timing of the pulsed light according to the pseudo random number, and the charge transfer control means changes timings of application of two control pulses for transferring charge corresponding to the two amounts of charge among timings of application of the first to M-th control pulses according to the pseudo random number so that the timings are replaced with each other.

Alternatively, a distance image measurement system according to another embodiment of the present invention includes a plurality of distance image measurement devices of the above form, wherein a cycle of the frame period is set to be the same in the plurality of distance image measurement devices.

Alternatively, a distance image measurement method according to another embodiment of the present invention includes a light source control step of controlling, by a light source control means, a light source so that pulsed light having a first duration is repeatedly generated within a periodic frame period; a charge transfer control step of using a pixel circuit unit including a photoelectric conversion region configured to convert light into charge, first to M-th charge readout regions (M is an integer equal to or greater than 2) provided to be close to the photoelectric conversion region and separated from each other, and first to M-th control electrodes provided in correspondence with the photoelectric conversion region and the first to M-th charge readout regions and for applying first to M-th control pulses for charge transfer between the photoelectric conversion region and the first to M-th charge readout regions, and sequentially applying, by a charge transfer control means, the first to M-th control pulses to the first to M-th control electrodes only for a second duration within the frame period in correspondence with the generation of the pulsed light by the light source control means; a signal readout step of reading out, by a signal readout means, a detection signal according to first to M-th amounts of charge, the first to M-th amounts of charge being amounts of charge transferred to the first to M-th charge readout regions of the pixel circuit unit according to the application of the first to M-th control pulses by the charge transfer control means; a distance calculation step of repeatedly calculating, by a distance calculation means, a distance from a difference value between two of the first to M-th amounts of charge on the basis of the detection signal; and a pseudo random number generation step of generating a pseudo random number by a pseudo random number generation means, wherein the light source control step includes changing a generation timing of the pulsed light according to the pseudo random number, and the charge transfer control step includes changes timings of application of two control pulses for transferring charge corresponding to the two amounts of charge among timings of application of the first to M-th control pulses according to the pseudo random number so that the timings are replaced with each other.

According to the distance image measurement device, the distance image measurement system, or the distance image measurement method of the above-described embodiment, pulsed light is periodically and repeatedly generated from the light source within a periodic frame period, a time window having a second duration is sequentially set in correspondence with the generation of the pulsed light, and charge is sequentially transferred from the photoelectric conversion region of the pixel circuit unit to the first to M-th charge readout regions in the time window. Further, detection signals according to the first to M-th charge amounts are read out from the first to M-th charge readout regions of the pixel circuit unit, and the distance is repeatedly calculated from the difference value between the two charge amounts on the basis of the detection signals. In this case, the generation timing of the pulsed light is changed according to the pseudo random number, and the timings of the time windows of the two charge readout regions that are the basis of the difference value are replaced within the frame period. As a result, even when a plurality of distance image measurement devices execute simultaneous measurement to generate pulsed light, it is possible to offset an influence of pulsed light mixed from an external distance image measurement device on a difference value between two amounts of charge. As a result, even when a plurality of distance image measurement devices execute simultaneous measurement, it is possible to reduce an error of the distance calculation due to the presence of mixed pulsed light, and to generate an image signal with sufficiently improved measurement accuracy.

Advantageous Effects of Invention

According to an aspect of the present invention, it is possible to sufficiently improve measurement accuracy when a plurality of devices are used at the same time.

BRIEF DESCRIPTION OF DRAWINGS

FIGS. 6(a) and 6(b) are timing charts illustrating an example examples of timings of control pulses $P_1$ and $P_2$ generated by the pulse pattern generation circuit 33.

FIGS. 12(a)-12(c) are diagrams illustrating timings of various signals handled in a modification example of a four-tap configuration and changes in values of detection signals detected for each frame period in the modification example.

FIGS. 15(a)-15(c) are diagrams illustrating timings of various signals handled by the distance image sensor 10 and changes in values of the detection signals detected by the distance image sensor 10 for each frame period.

DESCRIPTION OF EMBODIMENTS

Hereinafter, preferred embodiments of a distance image measurement device according to the present invention will be described in detail with reference to the drawings. In description of the drawings, the same or corresponding parts will be denoted by the same reference signs, and redundant description will be omitted.

Figure 1:
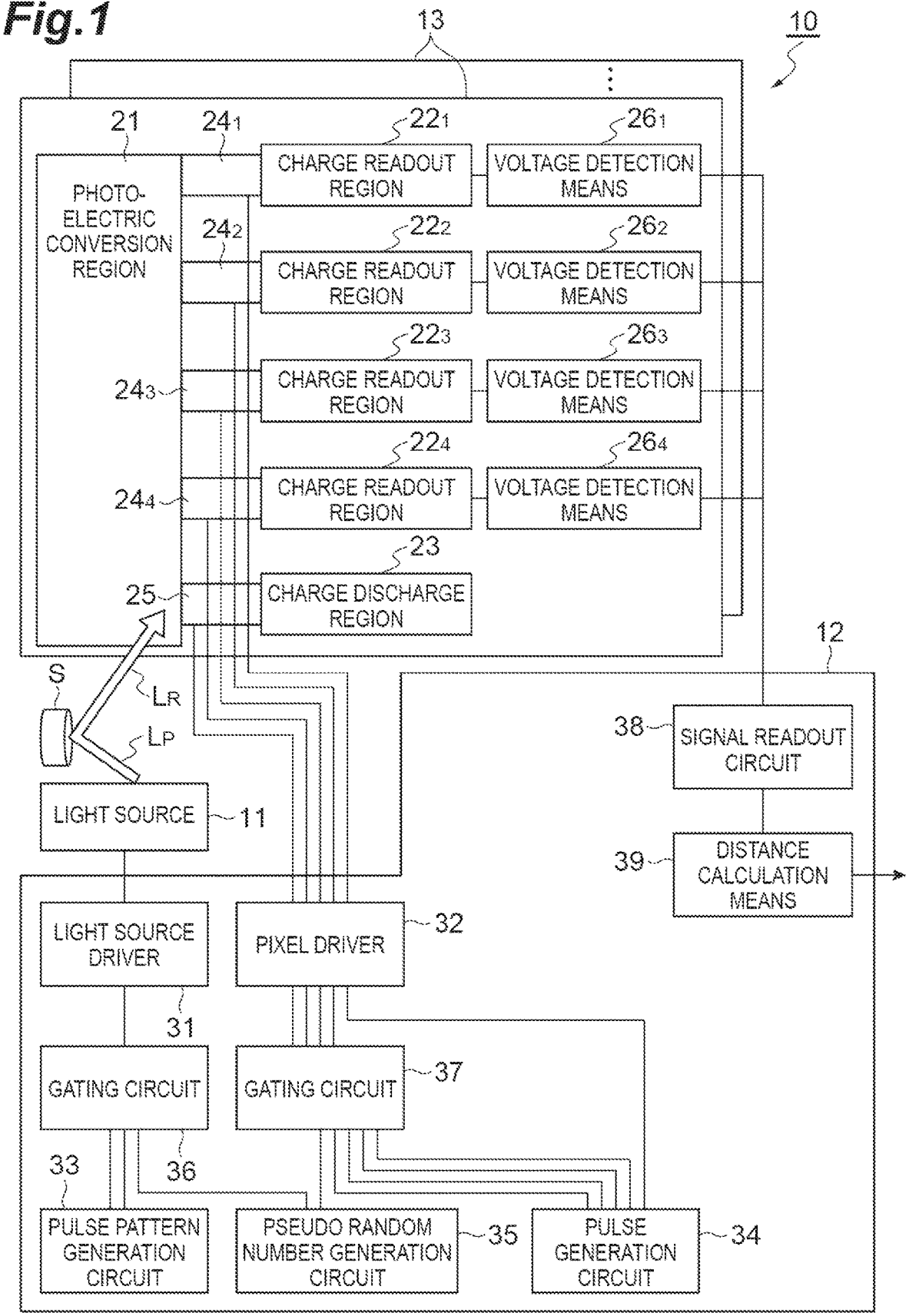
FIG. 1 is a block diagram illustrating a schematic configuration of a distance image sensor 10 according to a preferred embodiment of the present invention.

First, a function and configuration of a distance image sensor 10 according to a preferred embodiment of the distance image measurement device of the present invention will be described with reference to FIG. 1. The distance image sensor 10 illustrated in FIG. 1 is a device that generates a distance image including distance information for individual pixels using a time-of-flight method, and includes a light source 11, a computation circuit 12, and a plurality of pixel circuits (pixel circuit units) 13. The light source 11 is a device that generates pulsed light $L_P$ with which a target S is irradiated, in order to perform distance measurement using a time-of-flight (TOF) scheme. The light source 11 includes, for example, a semiconductor light emitting element such as a light emitting diode or a laser diode, and a driving circuit that drives the semiconductor light emitting element. As the light source 11, an element that generates light in a wavelength region such as a near infrared region and a visible light region can be used. Further, the distance image sensor 10 includes the plurality of pixel circuits 13. The plurality of pixel circuits 13 are arranged in a two-dimensional array in directions in two dimensions (for example, a column direction and a row direction) to constitute an image sensor, and photoelectrically convert incident pulsed light $L_R$ generated due to reflection of the pulsed light $L_P$ at the target S to generate detection signals. In addition, the distance image sensor 10 includes the computation circuit 12. The computation circuit 12 calculates distance information on the target S for each pixel using the detection signals generated by the plurality of pixel circuits 13, and generates and outputs a distance image including two-dimensional image information in which the distance information for each pixel is reflected. The computation circuit 12 may be configured of a dedicated integrated circuit such as a one-chip microcomputer including a CPU, a RAM, a ROM, an input/output device, and the like or may be configured of a general-purpose computer such as a personal computer. In the present embodiment, the computation circuit 12 is configured of an on-chip integrated circuit mounted on the same semiconductor chip together with the pixel circuit 13. "On the same semiconductor chip" also includes on a different semiconductor among a plurality of semiconductor layers laminated by using silicon on insulator (SOI) technology or through silicon via (TSV) technology.

Hereinafter, configurations of the pixel circuits 13 and the computation circuit 12 will be described in detail.

First, the configuration of one of the pixel circuits 13 will be described. The pixel circuit 13 includes a photoelectric conversion region 21 configured of semiconductor elements and having a function of converting the incident pulsed light $L_R$ to charge, first to fourth charge readout regions $22_1$ to $22_4$ and a charge discharge region 23 provided to be close to the photoelectric conversion region 21 and separated from each other, first to fourth control electrodes $24_1$ to $24_4$ and a fifth control electrode 25 provided in correspondence with the first to fourth charge readout regions $22_1$ to $22_4$ and the charge discharge region 23, for applying a control pulse for charge transfer between the photoelectric conversion region 21 and the respective regions, and voltage detection means $26_1$ to $26_4$ for reading out detection signals from the first to fourth charge readout regions $22_1$ to $22_4$. The voltage detection means $26_1$ to $26_4$ are, for example, amplifiers including a source follower amplifier that selectively detect and amplify voltages on the basis of reference potentials of the respective charge readout regions $22_1$ to $22_4$, and output the amplified voltages to the computation circuit 12 as first to fourth detection signals, under the control of the computation circuit 12.

The pixel circuit 13 is formed on, for example, a p-type semiconductor substrate such as a silicon substrate. That is, the photoelectric conversion region 21 is provided in a central portion of a pixel formation area including an active region forming layer formed of a p-type semiconductor, an n-type surface embedded region, a p-type pinning layer, and an insulating film, which are formed in that order on the p-type semiconductor substrate. The n-type charge readout regions $22_1$ to $22_4$ and the charge discharge region 23 having a higher impurity concentration than the n-type surface embedded region are formed at positions spaced from each other and close to the photoelectric conversion region 21, and control electrodes $24_1$ to $24_4$ and 25 are provided on respective charge transfer paths from the photoelectric conversion region 21 on the insulating film to the charge readout regions $22_1$ to $22_4$ and the charge discharge region 23. Here, the respective control electrodes $24_1$ to $24_4$ and 25 may be provided on the charge transfer path, or may be provided to be divided into a plurality of electrode portions to sandwich the charge transfer path from both sides.

In the pixel circuit 13 having the above configuration, control pulses having different phases are applied from the computation circuit 12 to be described below to the control electrodes $24_1$ to $24_4$ and 25. Thereby, depletion layer potentials of the surface embedded region are sequentially changed, such that potential gradients allowing charge to be transferred to any of the charge transfer paths are sequentially formed, and majority carriers (charge) generated in the surface embedded region of the photoelectric conversion region 21 are moved to any one of the charge readout regions $22_1$ to $22_4$ and the charge discharge region 23. The charge discharge region 23 is a region for discharging the charge generated in the photoelectric conversion region 21.

Next, a configuration of the computation circuit 12 will be described. The computation circuit 12 includes a light source driver 31, a pixel driver 32, a pulse pattern generation circuit 33, a pulse generation circuit 34, a pseudo random number generation circuit (pseudo random number generation means) 35, a gating circuit 36, a gating circuit 37, and a signal readout circuit (a signal readout means) 38, and a distance calculation means 39. The light source driver 31, the gating circuit 36, and the pulse pattern generation circuit 33 constitute a light source control means of the embodiment. Further, the pixel driver 32, the gating circuit 37, and the pulse generation circuit 34 constitute a charge transfer control means of the embodiment.

The pseudo random number generation circuit 35 is a circuit that generates a pseudo random number, which is a bit sequence used for changing a light emission timing of the light source 11 and a timing of charge transfer in the pixel circuit 13. Specifically, the pseudo random number generation circuit 35 generates an M sequence (maximum-length sequence), which is a type of pseudo-noise (PN) sequence. This M sequence is a bit sequence that is periodically repeated with a certain number of bits, and each bit sequence is generated in synchronization with a frame period that is an emission cycle of the pulsed light $L_P$.

The light source driver 31 controls an emission timing of the pulsed light $L_P$ in the light source 11, an intensity of the pulsed light $L_P$, and a pulse width of the pulsed light $L_P$. Specifically, the pulsed light $L_P$ having a duration $T_p$ is controlled to be repeatedly generated within a period of one frame, which is a periodically repeated period $T_f$ (for example, $\frac{1}{120}$ sec) having a preset length. In this case, the light source driver 31 changes a generation timing of the pulsed light $L_P$ within a period of one frame between a first timing and a second timing according to the control pulses $P_1$ and $P_0$ output from the gating circuit 36. The pulse pattern generation circuit 33 generates the control pulses $P_1$ and $P_0$ indicating the first timing and the second timing, which are the generation timings of the pulsed light $L_P$. The gating circuit 36 switches between the two control pulses $P_1$ and $P_0$ according to the pseudo random number output from the pseudo random number generation circuit 35 and outputs the resultant control pulse to the light source driver 31. Accordingly, the generation timing of the pulsed light $L_P$ is changed between the first timing and the second timing according to the pseudo random number.

The pixel driver 32 has a function of applying first to fourth control pulses $G_1$ to $G_4$ and a fifth control pulse $G_D$ to the control electrodes $24_1$ to $24_4$ and 25, respectively. That is, the pixel driver 32 sequentially applies the first to fourth control pulses $G_1$ to $G_4$ to the control electrodes $24_1$ to $24_4$ only during a duration $T_1$ equal to or longer than the duration $T_p$ in correspondence with the respective generation timings of the pulsed light $L_P$ within one frame period. In the present embodiment, the duration $T_1$ is set to be equal to the duration $T_p$. In this case, the pixel driver 32 applies control pulses $G_1$ to $G_4$ and $G_D$ using the control pulses $G_1$ to $G_4$ output from the gating circuit 37 and the control pulse $G_D$ directly output from the pulse generation circuit 34. The pulse generation circuit 34 generates the control pulses $G_1$ to $G_4$ and $G_D$. Specifically, the pulse generation circuit 34 generates the control pulses $G_1$ to $G_4$ in two patterns in which an order is replaced between two subframes within one frame period, and generates the control pulse $G_D$ in a period other than application timings of the first to fourth control pulses $G_1$ to $G_4$. The gating circuit 37 switches the first to fourth control pulses $G_1$ to $G_4$ generated in two subframes within one frame period between the two patterns according to the pseudo random number output from the pseudo random number generation circuit 35, and outputs the first to fourth control pulses $G_1$ to $G_4$ to the pixel driver 32. Accordingly, the timing of the charge transfer to the charge readout regions $22_1$ to $22_4$ of the pixel circuit 13 is changed between the two patterns according to the pseudo random number.

A signal readout circuit 38 is a circuit that reads out the first to fourth detection signals $S_1$ to $S_4$ corresponding to amounts of charge transferred to the charge readout regions $22_1$ to $22_4$ of the respective pixel circuits 13 in a plurality of frame periods by controlling the voltage detection means $26_1$ to $26_4$. The distance calculation means 39 repeatedly executes calculation of a distance for each pixel circuit 13 for the plurality of frame periods on the basis of the detection signals $S_1$ to $S_4$ read for each pixel circuit 13 by the signal readout circuit 38 to repeatedly generate a distance image including resultant distance information, and outputs the distance image to the outside. In this case, the distance calculation means 39 may repeatedly perform the distance calculation for the first to fourth detection signals $S_1$ to $S_4$ read out for each frame period to obtain an average value of resultant distance calculation results as distance information, or may execute distance calculation for the first to fourth detection signals $S_1$ to $S_4$ corresponding to an amount of pixels accumulated in the plurality of frame periods to obtain a distance calculation result as the distance information.

Figure 2:
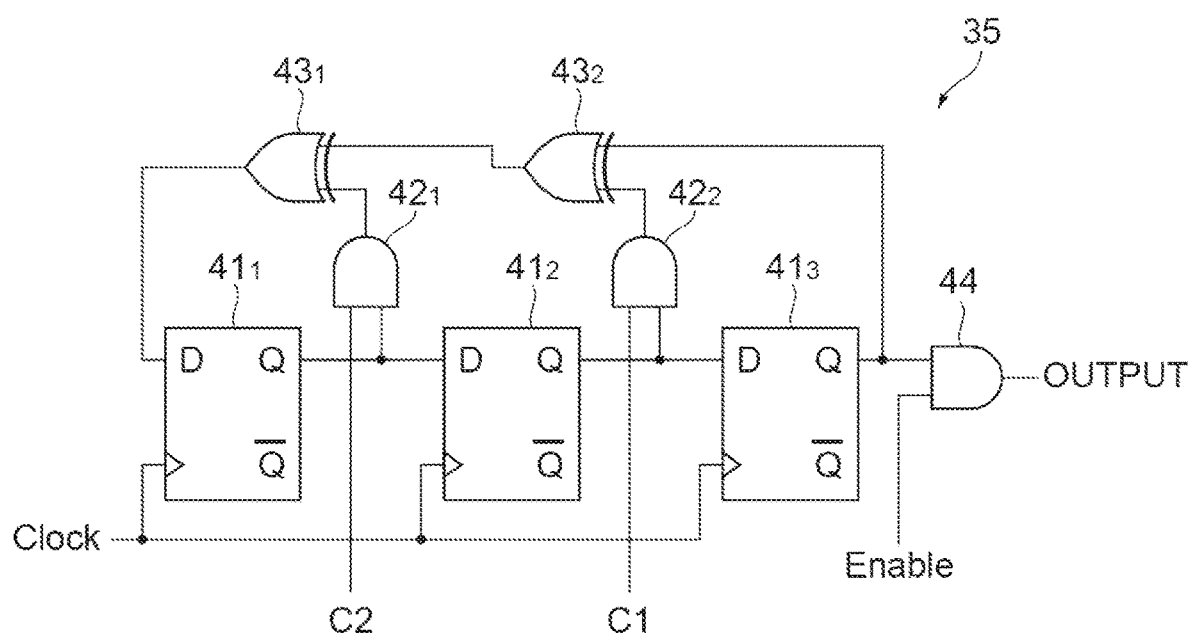
FIG. 2 is a circuit diagram illustrating an example of a configuration of a pseudo random number generation circuit 35.

FIG. 2 illustrates an example of a circuit configuration of the pseudo random number generation circuit 35. In this configuration example, it is possible to generate an M sequence having a periodicity of p=7. Specifically, the pseudo random number generation circuit 35 can be configured of D flip-flop circuits $41_1$ to $41_3$, AND circuits $42_1$, $42_2$, and 44, and XOR (exclusive OR) circuits $43_1$ and $43_2$. The D flip-flop circuits $41_1$ to $41_3$ are connected to each other, a Q output from the D flip-flop circuit $41_1$ in a first stage is sequentially input to D inputs of the D flip-flop circuits $41_2$ and $41_3$ in a subsequent stage, and a Q output of the D flip-flop circuit $41_3$ in a final stage is output to the outside via an AND circuit 44 when an enable signal is ON. The Q outputs of the D flip-flop circuits $41_1$ and $41_2$ other than the final stage pass through the AND circuits $42_1$ and $42_2$, respectively, so that the Q outputs are subjected to an AND operation with coefficients C2 and C1 and then input to the XOR circuits $43_1$ and $43_2$. The Q output of the D flip-flop circuit $41_3$ in the final stage is input to the XOR circuit $43_2$ and an exclusive OR operation is performed on such a Q output and an output of the AND circuit $42_2$. An output of the XOR circuit $43_2$ is input to the XOR circuit $43_1$ and an exclusive OR operation is performed on such an output and an output of the AND circuit $42_1$. An output of the XOR circuit $43_1$ is input to a D input of the D flip-flop circuit $41_1$ in the first stage.

In the pseudo random number generation circuit 35 having the above configuration, when the coefficient C1="0" and the coefficient C2="1" are set, an M sequence repeated as "1001011" can be generated, and when the coefficient C1="1" and the coefficient C2="0" are set, an M sequence repeated as "1001110" can be generated. In the above configuration, when the incident pulsed light $L_R$ is exposed in the pixel circuit 13, the enable signal="1" is set so that the charge transfer in the pixel circuit 13 and the emission of the pulsed light $L_P$ are performed, and when the detection signal is read out from the pixel circuit 13, the enable signal="0" is set so that the charge transfer in the pixel circuit 13 and the emission of the pulsed light $L_P$ stops. The circuit configuration illustrated in FIG. 2 is an example and the number of stages of the D flip-flops may be changed. For example, when the number of stages is n, it is possible to generate an M sequence which is one type of pseudo-noise sequence having periodicity $p=2^n-1$ and having uniformity in which the number of appearances of "1" in one cycle is $2^{n-1}$ and the number of appearances of "0" in one cycle is $2^{n-1}-1$. Further, the M sequence generated by such a configuration has a sufficiently high autocorrelation with an M sequence in which a bit position matches, as compared with a correlation with an M sequence in which a bit position has been shifted.

Figure 3:
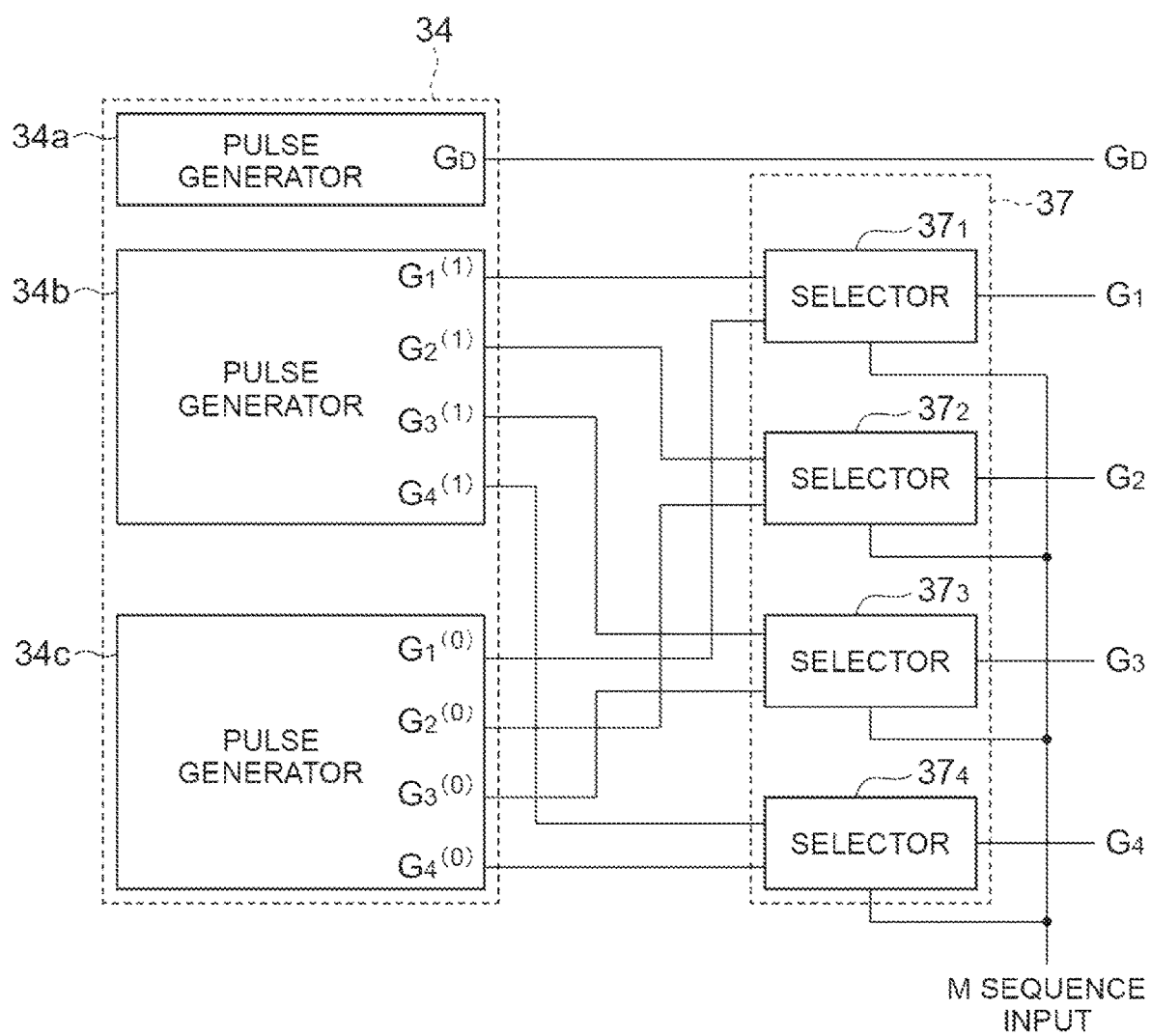
FIG. 3 is a block diagram illustrating an example of a configuration of a pulse generation circuit 34 and a gating circuit 37.

FIG. 3 is a block diagram illustrating an example of a circuit configuration of the pulse generation circuit 34 and the gating circuit 37. The pulse generation circuit 34 includes a pulse generator 34a that generates the control pulse $G_D$ and outputs the control pulse $G_D$ to the pixel driver 32, a pulse generator 34b that generates the first to fourth control pulses $G_1$ to $G_4$ as control pulses $G_1^{(1)}$ to $G_4^{(1)}$ of a timing of a first pattern within two subframes within one frame period, and a pulse generator 34c that generates the control pulses $G_1$ to $G_4$ as control pulses $G_1^{(0)}$ to $G_4^{(0)}$ of a timing of a second pattern within two subframes within one frame period. Further, the gating circuit 37 includes a selector $37_1$ that selects one of first control pulses $G_1^{(1)}$ and $G_1^{(0)}$ of the two patterns according to a bit value of the M sequence input from the pseudo random number generation circuit 35, and outputs the selected control pulse to the pixel driver 32, a selector $37_2$ that selects one of second control pulses $G_2^{(1)}$ and $G_2^{(0)}$ of the two patterns according to the bit value of the M sequence input from the pseudo random number generation circuit 35, and outputs the selected control pulse to the pixel driver 32, a selector $37_3$ that selects one of third control pulses $G_3^{(1)}$ and $G_3^{(0)}$ of the two patterns according to the bit value of the M sequence input from the pseudo random number generation circuit 35, and outputs the selected control pulse to the pixel driver 32, and a selector $37_4$ that selects one of fourth control pulses $G_4^{(1)}$ and $G_4^{(0)}$ of the two patterns according to the bit value of the M sequence input from the pseudo random number generation circuit 35, and outputs the selected control pulse to the pixel driver 32.

Figure 4A:
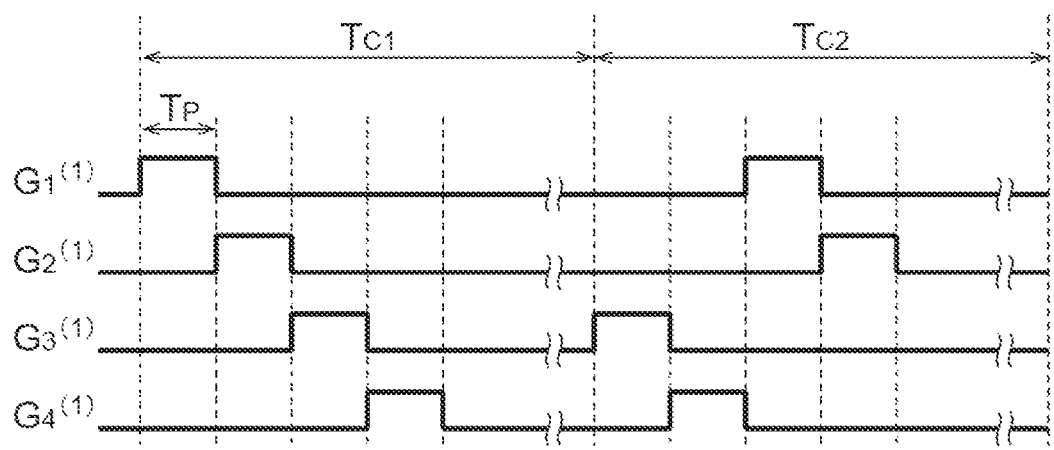
FIGS. 4(a) and 4(b) are timing charts illustrating examples of timings of control pulses $G_1$ to $G_4$ generated by the pulse generation circuit 34.
Figure 4B:
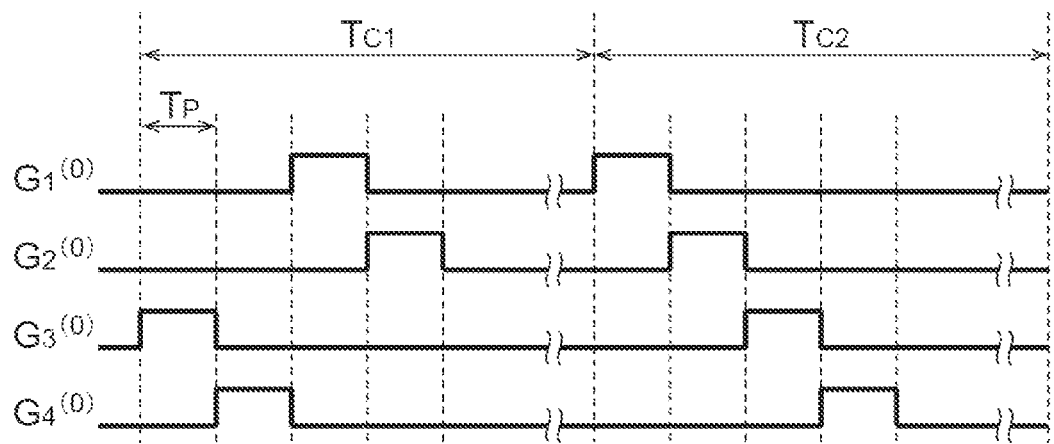

FIG. 4(a) is a timing chart illustrating an example of timings of control pulses $G_1^{(1)}$ to $G_4^{(1)}$ of the first pattern generated by the pulse generation circuit 34, and FIG. 4(b) is a timing chart illustrating an example of timings of control pulses $G_1^{(0)}$ to $G_4^{(0)}$ of the second pattern generated by the pulse generation circuit 34. As shown in this example, the pulse generation circuit 34 generates the first to fourth control pulses $G_1^{(1)}$ to $G_4^{(1)}$ in that order in a first half subframe period Tc in one frame period in the first pattern, and generates the first to fourth control pulses $G_1^{(0)}$ to $G_4^{(0)}$ in that order in a second half subframe period $T_{C2}$ in the one frame period in the second pattern. In the second half subframe period $T_{C2}$ in the first pattern, timings between each of the two control pulses $G_1$ and $G_2$ and each of the two control pulses $G_3$ and $G_4$ are replaced with each other between the first half subframe period $T_{C1}$ and the second half subframe period $T_{C2}$. Similarly, in the first half subframe period $T_{C1}$ in the second pattern, timings between each of the two control pulses $G_1$ and $G_2$ and each of the two control pulses $G_3$ and $G_4$ are replaced with each other between the first half subframe period $T_{C1}$ and the second half subframe period $T_{C2}$. Accordingly, through an operation of the gating circuit 37, an order of application of the first to fourth control pulses $G_1$ to $G_4$ in the first subframe period $T_{C1}$ and an order of application of the first to fourth control pulses $G_1$ to $G_4$ in the second subframe period $T_{C2}$ are replaced according to the value of the M sequence. Here, the two control pulses $G_1$ and $G_3$ and the two control pulses $G_2$ and $G_4$ of which timings are replaced with each other correspond to control pulses for transferring charge that is the basis of a difference value of the amount of charge used in the distance calculation in the distance calculation means 39 (details will be described below).

Figure 5:
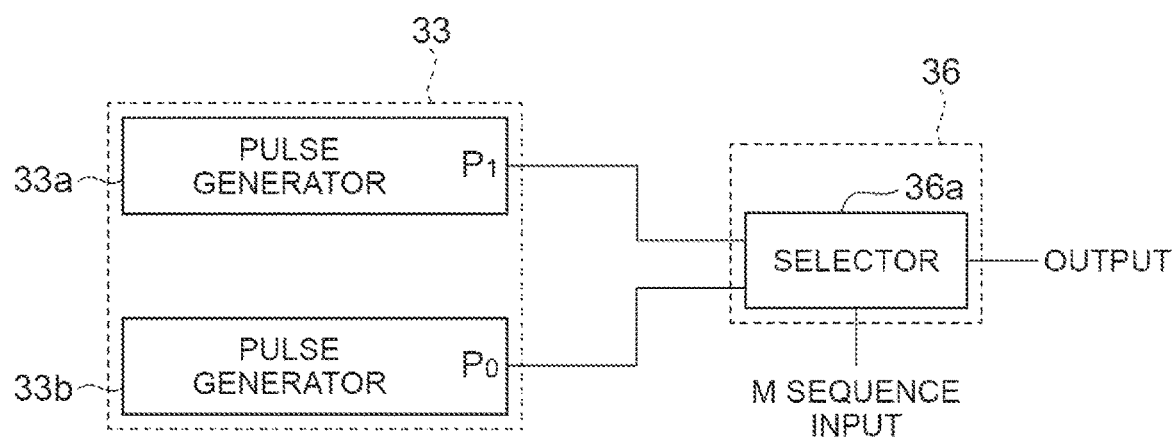
FIG. 5 is a block diagram illustrating an example of a configuration of a pulse pattern generation circuit 33 and a gating circuit 36.

FIG. 5 is a block diagram illustrating an example of a circuit configuration of the pulse pattern generation circuit 33 and the gating circuit 36. The pulse pattern generation circuit 33 includes a pulse generator 33a that generates a control pulse $P_1$ and outputs the control pulse $P_1$ to the gating circuit 36, and a pulse generator 33b that generates a control pulse $P_0$ and outputs the control pulse $P_0$ to the gating circuit 36. Further, the gating circuit 36 includes a selector 36a that selects one of the control pulses $P_1$ and $P_0$ of the two patterns according to the bit value of the M sequence input from the pseudo random number generation circuit 35 and outputs the selected control pulse to the light source driver 31.

FIG. 6(a) is a timing chart illustrating an example of the control pulse $P_1$ of the first timing generated by the pulse pattern generation circuit 33, and FIG. 6(b) is a timing chart illustrating an example of the control pulse $P_0$ of the second timing generated by the pulse pattern generation circuit 33. As shown in this example, the pulse pattern generation circuit 33 generates the control pulse $P_1$ at the same timing as the first control pulse $G_1^{(1)}$ of the first pattern in the first half subframe period $T_{C1}$ of the one frame period as the first timing, and generates the control pulse $P_0$ at the same timing as the first control pulse $G_1^{(0)}$ of the second pattern in the second half subframe period $T_{C2}$ of the one frame period as the second timing. Accordingly, through an operation of the gating circuit 36, a timing of the emission of the pulsed light $L_P$ is changed between a timing matching the timing of the first control pulse $G_1$ of the first pattern within the first subframe period $T_{C1}$ and a timing matching the timing of the first control pulse $G_1$ of the second pattern within the second subframe period $T_{C2}$ according to the value of the M sequence.

Next, a flow of distance calculation in the computation circuit 12 will be described, and a distance image measurement method of the embodiment will be described in detail.

Figure 7:
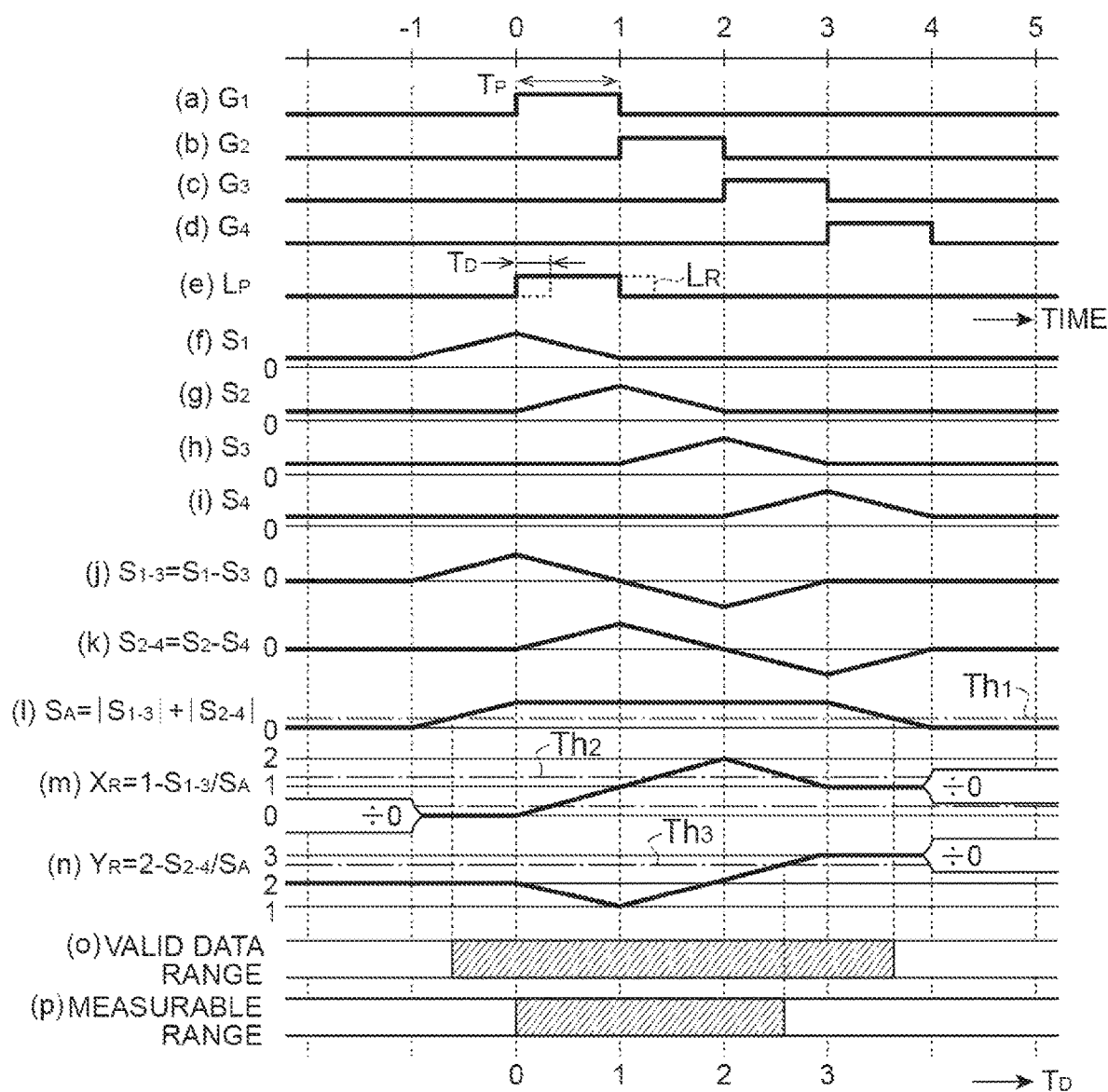
FIG. 7 is a timing chart of various signals handled by the distance image sensor 10 of FIG. 1 and a graph showing changes in various values calculated by the distance image sensor 10 with respect to a delay time $T_D$.

FIG. 7 is a timing chart of various signals handled by the computation circuit 12 of the distance image sensor 10 and a graph showing changes in various calculated values with respect to a delay time $T_D$ of the incident pulsed light $L_R$. In FIG. 7, parts (a) to (e) illustrate timings of the control pulses $G_1$ to $G_4$ and the pulsed light $L_P$, respectively, parts (f) to (n) illustrate values of the first to fourth detection signals $S_1$ to $S_4$, values of difference values $S_{1-3}$ and $S_{2-4}$, a value of a distance data validity determination signal $S_A$, and values of distance calculation reference signals $X_R$ and $Y_R$ in correspondence with the delay time $T_D$, part (o) illustrates a valid data range in the delay time $T_D$, and part (p) illustrates a measurable range in the delay time $T_D$. FIG. 7 illustrates various signals and values in the subframe period including the emission timing of the pulsed light $L_P$, and illustrates temporal change in signal waveforms and values with the duration $T_p$ of the pulsed light $L_P$ as a unit of time.

First, when a distance image generation process in the distance image sensor 10 is started, the light source control means and the charge transfer control means of the computation circuit 12 sets the timings of the control pulses $G_1$ to $G_4$ and the pulsed light $L_P$ on the basis of the M sequence generated in the pseudo random number generation circuit 35 in two subframe periods $T_{C1}$ and $T_{C2}$ within one frame period (a pseudo random number generation step, a light source control step, and a charge transfer control step). Specifically, in the respective subframe periods $T_{C1}$ and $T_{C2}$, the timing of the pulsed light $L_P$ is changed between the first timing in the first subframe $T_{C1}$ and the second timing in the second subframe $T_{C2}$ on the basis of the M sequence, and an order of the timings of the control pulses $G_1$ to $G_4$ is replaced between the first subframe $T_{C1}$ and the second subframe $T_{C2}$ in correspondence with the timing of the pulsed light $L_P$. Thereafter, in a readout period after the frame period is repeated a plurality of times (or after one frame period), the signal readout circuit 38 of the computation circuit 12 reads out the first to fourth detection signals $S_1$ to $S_4$ via the voltage detection means $26_1$ to $26_4$ of each pixel circuit 13, and the detection signals $S_1$ to $S_4$ are output to the distance calculation means 39 of the computation circuit 12 (a signal readout step). Here, although the exposure of the incident pulsed light $L_R$ in the pixel circuit 13 (the pseudo random number generation step, the light source control step, and the charge transfer control step) and the readout of the detection signals $S_1$ to $S_4$ (the signal readout step) are separated and performed in the present embodiment, the exposure may be performed during the signal readout.

Then, the distance calculation means 39 calculates the distance information for each pixel in one frame period unit or a plurality of frame period units on the basis of the detection signals $S_1$ to $S_4$ output from each pixel circuit 13 (distance calculation step). That is, the distance calculation means 39 uses Equation (1) below:

$$S_{1-3} = S_1 - S_3 \tag{1}$$

to calculate a difference value $S_{1-3}$ of the detection signals $S_1$ and $S_3$ on the basis of the detection signals $S_1$ and $S_3$, and then calculates an absolute value $|S_{1-3}|$ of the difference value. In addition, the distance calculation means 39 uses Equation (2) below:

$$S_{2-4} = S_2 - S_4 \tag{2}$$

to calculate a difference value $S_{2-4}$ of the detection signals $S_2$ and $S_4$ on the basis of the detection signals $S_2$ and $S_4$, and then calculates an absolute value $|S_{2-4}|$ of the difference value. Further, the distance calculation means 39 adds the absolute value $|S_{1-3}|$ of the difference value to the absolute value $|S_{2-4}|$ of the difference value, and uses Equation (3) below:

$$S_A = |S_{1-3}| + |S_{2-4}| \quad (3)$$

to calculate the value of the distance data validity determination signal $S_A$. This distance data validity determination signal $S_A$ is a signal for determining whether the calculation of the distance based on the first to fourth detection signals $S_1$ to $S_4$ is valid. The distance calculation means 39 compares the value of the distance data validity determination signal $S_A$ with a threshold value $Th_1$ to determine whether or not the calculation of the distance using the detection signals $S_1$ to $S_4$ is valid. For example, the threshold value $Th_1$ is set to about "0" so that a range from a value between "−1" and "0" of the delay time $T_D$ to a value between "3" to "4" is determined to be a "valid data range", which is a range in which the distance calculation is valid, as illustrated in part (o) of FIG. 7. Further, the distance calculation means 39 calculates a ratio between the value $S_{1-3}$ of the difference between the detection signals $S_1$ and $S_3$ and the value of the distance data validity determination signal $S_A$, and uses Equation (4) below:

$$X_R = 1 - S_{1-3}/S_A \quad (4)$$

to calculate the value of the first distance calculation reference signal $X_R$, and also calculates a ratio of the difference value $S_{2-4}$ between the detection signals $S_2$ and $S_4$ and the value of the distance data validity determination signal $S_A$, and uses Equation (5) below:

$$Y_R = 2 - S_{2-4}/S_A \quad (5)$$

to calculate the value of the second distance calculation reference signal $Y_R$. These distance calculation reference signals $X_R$ and $Y_R$ are signals for determining whether or not a position of an object S is in a measurable range.

Then, the distance calculation means 39 determines whether or not the value of the distance calculation reference signal $X_R$ is in a predetermined range to select a value referred to for the distance calculation from the distance calculation reference signal $X_R$ and the distance calculation reference signal $Y_R$. For example, when the value of the distance calculation reference signal $X_R$ is "0" or more and a threshold value $Th_2$ or less, the distance calculation reference signal $X_R$ is selected, and when the value of the distance calculation reference signal $X_R$ exceeds the threshold value $Th_2$, the distance calculation reference signal $Y_R$ is selected. Through such a determination, it is possible to select the distance calculation reference signal in which a detection signal of a time window that an incidence timing of the incident pulsed light $L_R$ overlap has been reflected according to a position of the object S. Further, the distance calculation means 39 determines whether or not the values of the selected distance calculation reference signals $X_R$ and $Y_R$ are in a predetermined range, thereby determining whether or not the object S is in the measurable range. For example, a determination is made as to whether or not the value of the distance calculation reference signal $X_R$ is equal to or greater than "0", and a determination is made as to whether or not the value of the distance calculation reference signal $Y_R$ is equal to or smaller than a threshold value $Th_3$. Through such determinations, a case in which the object S is too close, the incident pulsed light $L_R$ deviates from a time window of a detection signal $S_2$, and the distance is not reflected in the value of the distance calculation reference signal $X_R$, and a case in which the object S is too far, the incident pulsed light $L_R$ deviates from a time window of a detection signal $S_3$, and the distance is not reflected in the value of the distance calculation reference signal $Y_R$ can be excluded from the distance calculation. For example, the threshold value $Th_3$ is set to about "3", so that a range from "0" of the delay time $T_D$ to about "3" is determined to be the "measurable range", as illustrated in part (p) of FIG. 7.

Finally, when the distance calculation means 39 determines that the range is in the "valid data range" and determines that the range is in the "measurable range", the distance of the object S is calculated on the basis of the distance calculation reference signals $X_R$ and $Y_R$ selected for the pixel, calculation results of the respective frame periods are averaged (or calculation results for the plurality of frame periods are used) so that the distance information is acquired, and a distance image including the acquired distance information of each pixel is generated and output.

According to the distance image sensor 10 of the above-described embodiment, the pulsed light $L_P$ is periodically and repeatedly generated from the light source 11 within a periodic frame period, a time window of the duration $T_P$ is sequentially set in correspondence with the generation of the pulsed light $L_P$, and charge is sequentially transferred from the photoelectric conversion region 21 of the pixel circuit 13 to the first to fourth charge readout regions $22_1$ to $22_4$ in the time window. Further, the detection signals $S_1$ to $S_4$ corresponding to respective amounts of charge are read out from the first to fourth charge readout regions $22_1$ to $22_4$ of the pixel circuit 13, and the distance is repeatedly calculated from a difference value $S_{1-3}$ or a difference value $S_{2-4}$ between the two amounts of charge on the basis of the detection signals. In this case, the generation timing of the pulsed light $L_P$ is changed between the first timing and the second timing according to the M sequence which is a pseudo random number, and timings of time windows of two charge readout regions $22_1$ and $22_3$ or two charge readout regions $22_2$ and $22_4$, which are the basis of the difference value $S_{1-3}$ or the difference value $S_{2-4}$, are replaced within the frame period in correspondence with the generation timing of the pulsed light $L_P$. As a result, even when a plurality of distance image sensors 10 disposed close to each other execute simultaneous measurement to generate the pulsed light $L_P$, it is possible to reduce an influence of pulsed light $L_P$ mixed from an external distance image sensor 10 on the difference values $S_{1-3}$ and $S_{2-4}$ between the two amounts of charge. As a result, even when the plurality of distance image sensors 10 execute the simultaneous measurement, an error of the distance calculation due to the presence of the mixed pulsed light $L_P$ is reduced, and an image signal with sufficiently improved measurement accuracy can be generated.

Further, in the distance image sensor 10 of the above embodiment, the pseudo random number generation circuit 35 generates an M sequence that is a PN sequence, and the light source control means changes the generation timing of the pulsed light $L_P$ between the first timing included in the first subframe $T_{C1}$ and the second timing included in the second subframe $T_{C2}$ within the frame period according to the value of the M sequence, and the charge transfer control means replaces the control pulses $G_1$ and $G_2$ or the control pulses $G_3$ and $G_4$ applied immediately after the first timing among the first to fourth control pulses $G_1$ to $G_4$ with the control pulses $G_3$ and $G_4$ or the control pulses $G_1$ and $G_2$ applied immediately after the second timing among the first to fourth control pulses $G_1$ to $G_4$ according to the value of the M sequence. With such a configuration, even when a plurality of distance image sensors 10 disposed close to each other execute simultaneous measurement to generate the pulsed light $L_P$, it is possible to offset an influence of pulsed light $L_P$ mixed from an external distance image sensor 10 on the difference values $S_{1-3}$ and $S_{2-4}$ between the two amounts of charge. As a result, even when the plurality of distance image sensors 10 execute the simultaneous measurement, it is possible to further reduce an error of the distance calculation due to the presence of the mixed pulsed light $L_P$. In particular, the charge transfer control means replaces an order of the control pulses applied in the first subframe $T_{C1}$ among the first to fourth control pulses $G_1$ to $G_4$ with an order of the control pulses applied in the second subframe $T_{C2}$ among the first to fourth control pulses $G_1$ to $G_4$ according to the value of the M sequence. As a result, even when the plurality of distance image sensors 10 execute the simultaneous measurement, it is possible to further reduce an error of the distance calculation due to the presence of the mixed pulsed light $L_P$.

For example, in a distance image measurement system including a plurality of moving bodies (four-wheeled vehicles, two-wheeled vehicles, transport vehicles such as golf carts, ships, robots, automatic transport machines, and the like) each including the distance image sensor 10, when cycles of one frame period in the plurality of distance image sensors 10 are set to be the same, it is possible to prevent the accuracy of the distance calculation result from being degraded due to the interference of the pulsed light $L_P$ between each other. Further, it is also possible to measure a three-dimensional shape of the object S by using the distance image measurement system including the plurality of distance image sensors 10 having the same cycle of one frame period, and it is possible to realize distance measurement from all directions at 360 degrees, which covers portions not irradiated with the pulsed light $L_P$, while improving distance resolution. At this time, it is possible to prevent the accuracy of the distance calculation result from being degraded due to the interference of the pulsed light $L_P$ between each other. In such a distance image measurement system, it is not necessary to synchronize the frame period between the plurality of distance image sensors 10. Further, since it is not necessary to operate the plurality of distance image sensors 10 in time division, simultaneity of measurement is improved and measurement accuracy for a moving object S is also improved. Further, since it is not necessary to operate the distance image sensors 10 in time division, high measurement speed can be achieved. Further, in the distance image measurement system, it is also possible to improve the distance resolution by combining binocular (multi-eye) stereo measurement in which brightness information of an image has been used.

Further, in the distance image sensor 10 of the above-described embodiment, control of the timing of the pulsed light $L_P$ and control of the timing of the charge transfer are performed by using the M sequence. Therefore, it is possible to generate the PN sequences with high uniformity using a simple circuit, and to reduce an error of the distance calculation due to the presence of the mixed pulsed light $L_P$ using a simple configuration.

Figure 8A:
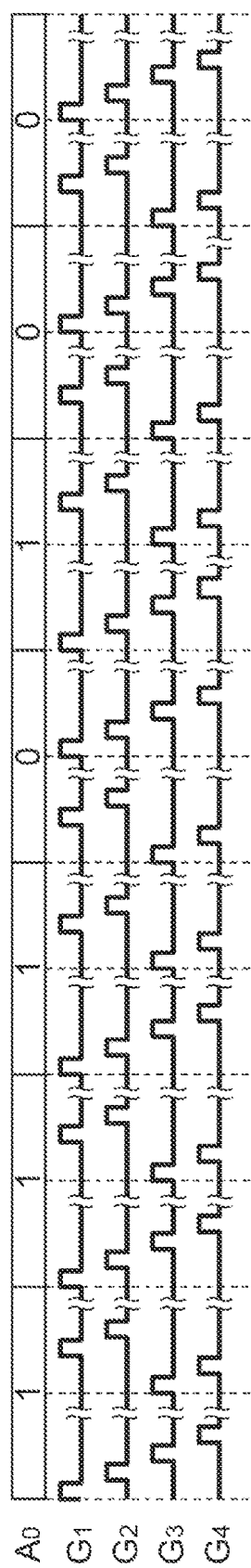
FIGS. 8(a)-8(c) are diagrams illustrating timings of various signals handled by the distance image sensor 10 of FIG. 1 and changes in values of detection signals detected by the distance image sensor 10 for each frame period.
Figure 8B:
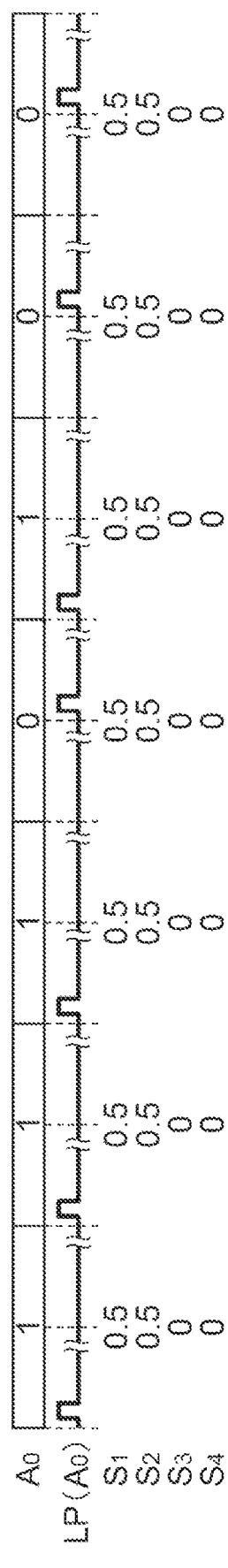
Figure 8C:
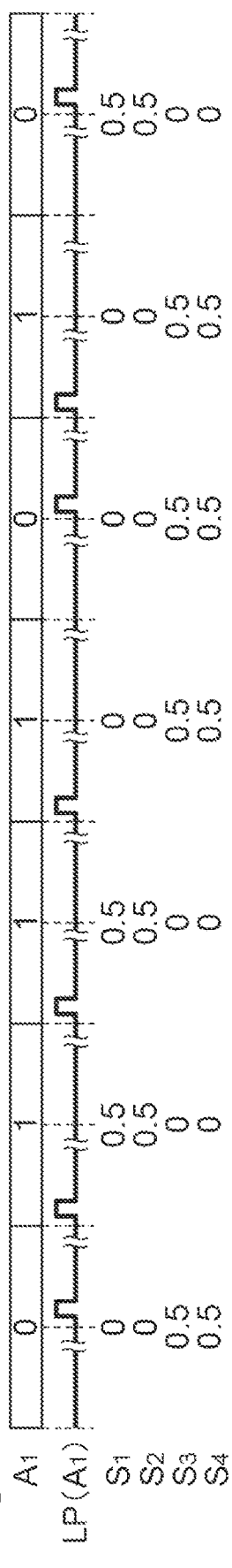

FIGS. 8(a)-8(c) are diagrams illustrating timings of various signals handled by the computation circuit 12 of the distance image sensor 10 and change in values of the detection signals detected by the computation circuit 12 for each frame period. In this case, it is assumed that pulsed light $L_P$ mixed from another distance image sensor at a timing shifted by about one frame period is present in the distance image sensor 10, and a value of the detection signal in a case in which the object S is present at a position in which reciprocating time of flight (TOF) of the pulsed light $L_P$ is 0.5 $T_P$ is shown. FIG. 8(a) illustrates an M sequence $A_0$ generated within the distance image sensor 10 and timings of the first to fourth control pulses $G_1$ to $G_4$ generated correspondingly, FIG. 8(b) illustrates the M sequence $A_0$ generated within the distance image sensor 10, a timing $L_P(A_0)$ of the pulsed light $L_P$ correspondingly incident on the distance image sensor 10, and values of detection signals $S_1$ to $S_4$ generated due to the pulsed light $L_P$, FIG. 8(c) illustrates an M sequence $A_1$ generated within another distance image sensor, a timing $L_P(A_1)$ of pulsed light $L_P$ correspondingly mixed from the other distance image sensor, and values of the detection signals $S_1$ to $S_4$ generated due to the pulsed light $L_P$. The values of the detection signals $S_1$ to $S_4$ shown here are shown as relative values, in which a signal value in a case in which the pulsed light $L_P$ with the duration $T_P$ has been received is "1" (the same applies hereinafter).

Distance calculation results in the distance image sensor 10 in a case in which interference of the pulsed light $L_P$ does not occur and a case in which the interference of the pulsed light $L_P$ occurs were evaluated on the basis of the values of the detection signals $S_1$ to $S_4$ shown in this example. As a result, when Equation (4) above is calculated, the distance calculation reference signal $X_R$ in a case in which the interference of the pulsed light $L_P$ does not occur is calculated using the following equation;

$$X_R=1-3.5/7=0.5,$$

the distance calculation reference signal $X_R$ in a case in which the interference of the pulsed light $L_P$ occurs is calculated using the following equation;

$$X_R=1-3/6=0.5,$$

and in both cases, the same distance calculation results are obtained.

Similarly, when the result of the distance calculation in a case in which the object S is present at positions in which the time of flight (TOF) is 1.5 $T_P$ and 2.5 $T_P$ was evaluated by using the distance calculation reference signal $Y_R$ of Equation (5) above, it was found that the same calculation results $Y_R=1.5$ and 2.5 were obtained in a case in which the interference of the pulsed light $L_P$ does not occur and a case in which the interference of the pulsed light $L_P$ occurs.

Further, an evaluation result in which the above distance calculation value has been generalized is shown. The number of times the pulsed light $L_P$ is received in the distance image sensor 10 is defined as N (a positive integer), the delay time in units of the duration $T_P$ of the pulsed light $L_P$ received in the distance image sensor 10 is defined as d ($0 \leq d \leq 1$), and the number of times the pulsed light $L_P$ generated with a random value matching a correct M sequence is received when pulsed light $L_P$ from another distance image sensor is received is defined as in (a positive integer equal to or smaller than N).

First, when the interference of the pulsed light $L_P$ does not occur, the detection signals are generated as $S_1=N(1-d)$, $S_2=Nd$, $S_3=0$, and $S_4=0$. Therefore, the distance calculation reference signal $X_R$ is calculated as $$X_R=1-(S_1-S_3)/(|S_1-S_3|+|S_2-S_4|)=d.$$

On the other hand, when the interference of the pulsed light LP occurs, the detection signals are generated as $S_1=(N+m)(1-d)$, $S_2=(N+m)d$, $S_3=(N-m)(1-d)$, $S_4=(N-m)d$. Therefore, in this case, the distance calculation reference signal $X_R$ is also calculated as $$X_R=1-(S_1-S_3)/(|S_1-S_3|+|S_2-S_4|)=d.$$

It was shown from this that, according to the distance image sensor 10, degradation of the distance calculation accuracy due to the interference of the pulsed light $L_P$ is reduced.

The present invention is not limited to the above-described embodiment.

Although the pixel circuit 13 is provided with the four charge readout regions $22_1$ to $22_4$ in the above-described embodiment, any number of charge readout regions (hereinafter, n charge readout regions are also called an "n tap") may be provided as long as the number of charge readout regions is equal to or greater than two. In this case, the control electrodes and the voltage detection means are provided in correspondence with the number n of charge readout regions, and the computation circuit 12 generates first to nth control pulses $G_1$ to $G_n$ corresponding to the number n of control electrodes and calculates distance information on the basis of first to nth detection signals $S_1$ to $S_n$ read out from the respective charge readout regions.

Hereinafter, a function of the modification example having a 2-tap configuration will be described.

Figure 9:
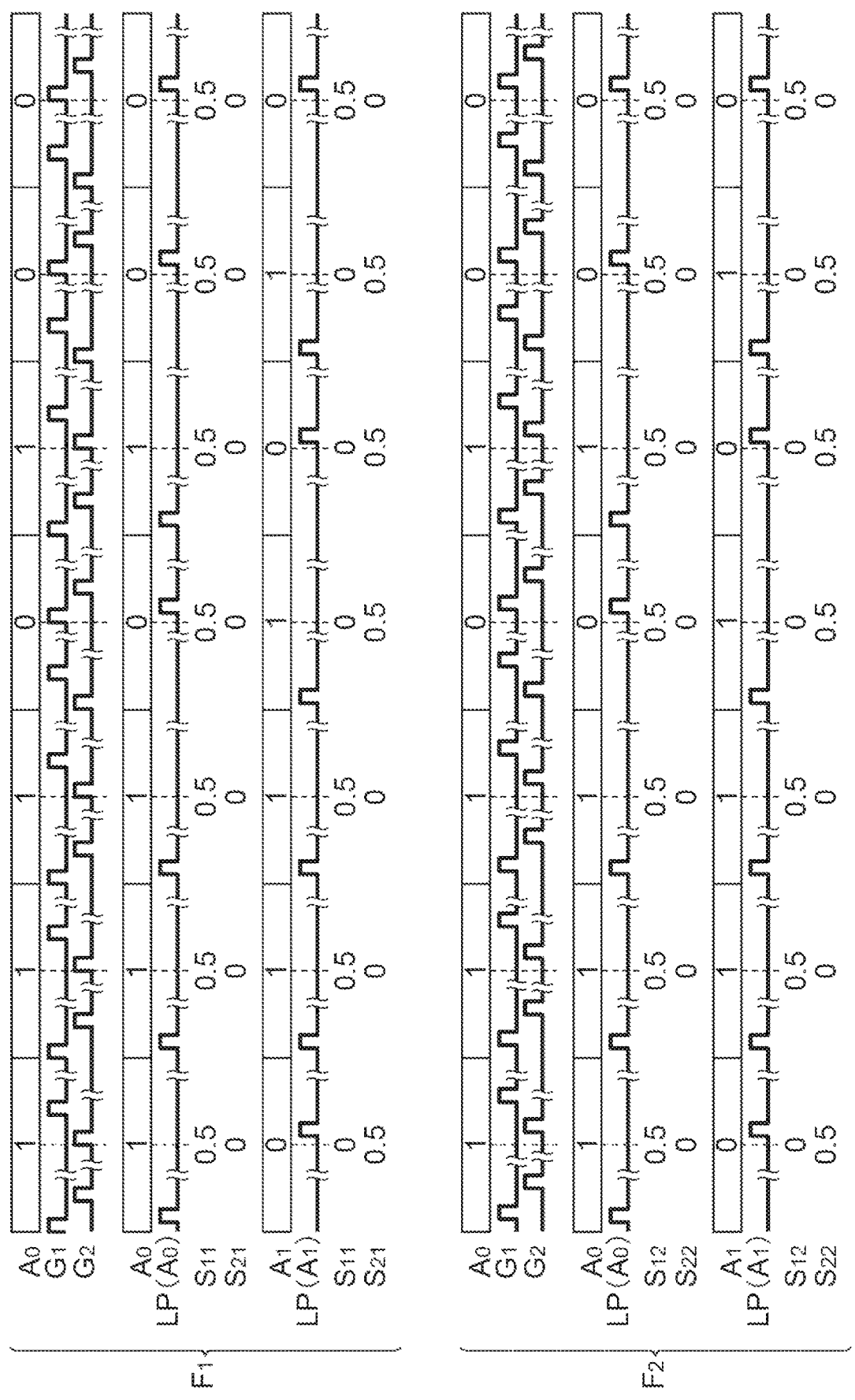
FIG. 9 is a diagram illustrating timings of various signals handled by a modification example of a two-tap configuration and changes in values of detection signals detected for each frame period.

FIG. 9 is a diagram illustrating changes in timings of various signals handled by the computation circuit 12 and values of detection signals detected by the computation circuit 12 for each frame period in the modification example having a two-tap configuration.

In the present modification example, a frame period is set as two types including a first frame period $F_1$ and a second frame period $F_2$, and in the first frame period $F_1$, the control pulses $G_1$ and $G_2$ at the same timing as the control pulses $G_1$ and $G_3$ of the above-described embodiment are generated for the two charge readout regions $22_1$ and $22_2$, the charge transfer is controlled, and then, the detection signals $S_{11}$ and $S_{21}$ are detected, and in the second frame period $F_2$, the control pulses $G_1$ and $G_2$ at the same timing as the control pulses $G_2$ and $G_4$ of the above-described embodiment are generated for the two charge readout regions $22_1$ and $22_2$, the charge transfer is controlled, and then, the detection signals $S_{12}$ and $S_{22}$ are detected. The distance is calculated on the basis of the detection signals $S_{11}$, $S_{12}$, $S_{21}$, and $S_{22}$ detected in the two frame periods $F_1$ and $F_2$ corresponding to the detection signals $S_1$, $S_2$, $S_3$, and $S_4$, as in the above embodiment.

In FIG. 9, an M sequence $A_0$ generated within the distance image sensor 10, timings of the control pulses $G_1$ and $G_2$ generated correspondingly, a timing $LP(A_0)$ at which the pulsed light $L_P$ generated within the distance image sensor 10 is incident, a value of a detection signal generated due to the pulsed light $L_P$, an M sequence $A_1$ generated within another distance image sensor, a timing $LP(A_1)$ of pulsed light $L_P$ correspondingly mixed from the other distance image sensor, and a value of a detection signal generated due to the pulsed light $L_P$ are shown for each of the frame periods $F_1$ and $F_2$. In this case, it is also assumed that pulsed light $L_P$ mixed from another distance image sensor at a timing shifted by about one frame period is present in the distance image sensor 10, and a value of the detection signal in a case in which the object S is present at a position in which reciprocating time of flight (TOF) of the pulsed light $L_P$ is 0.5 $T_P$ is shown Distance calculation results in the distance image sensor 10 in a case in which interference of the pulsed light $L_P$ does not occur and a case in which the interference of the pulsed light $L_P$ occurs were evaluated on the basis of the values of the detection signals $S_{11}$, $S_{12}$, $S_{21}$, and $S_{22}$ shown in this example, and as a result, a value of the distance calculation reference signal $X_R=0.5$ was obtained in both cases. It can be seen from this that the degradation of the distance calculation accuracy due to the interference of the pulsed light $L_P$ is reduced even in the modification example of the two taps.

Next, a function of a modification example having a 3-tap configuration will be described.

Figure 10:
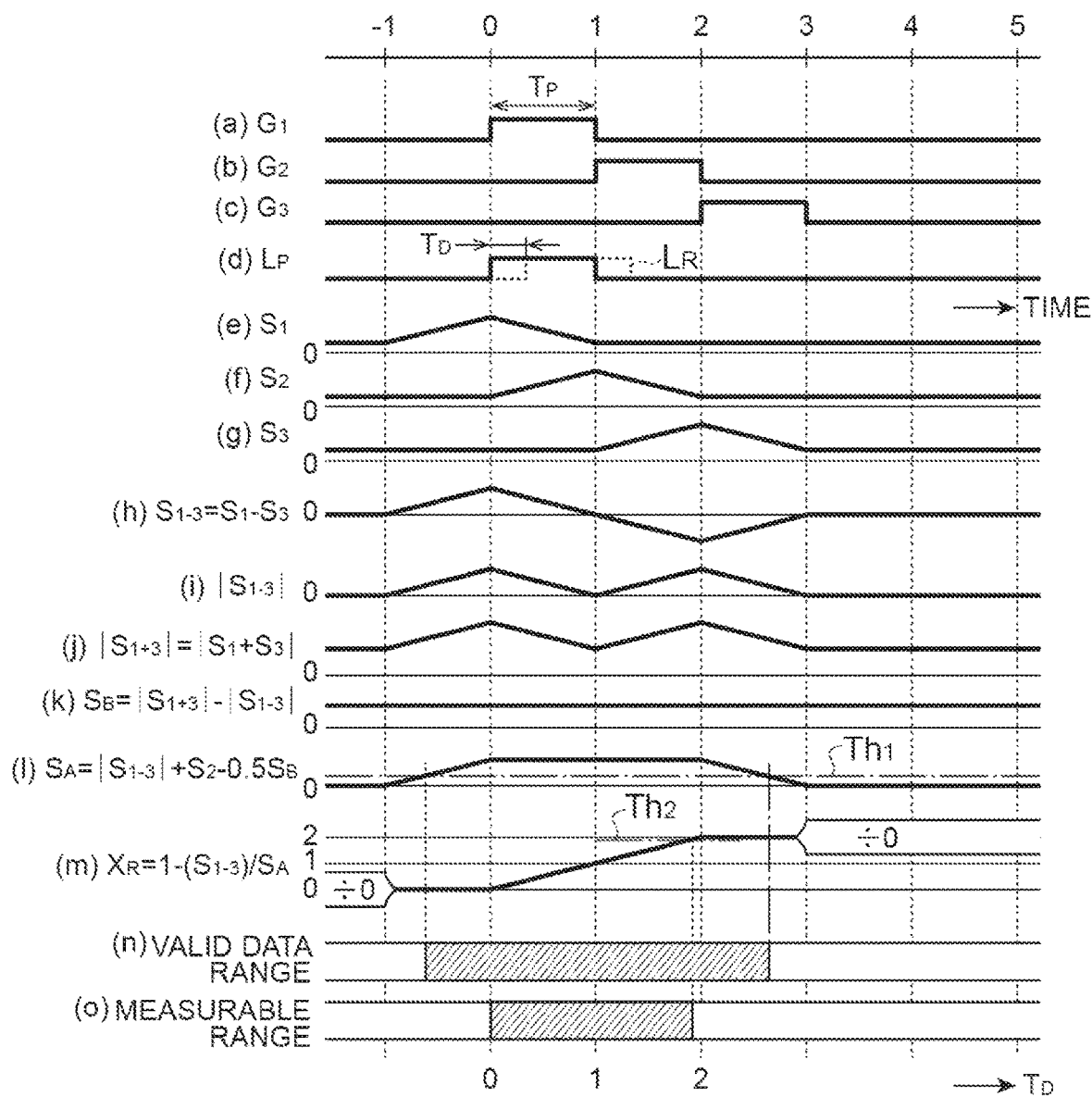
FIG. 10 is a timing chart of various signals handled in a modification example of a three-tap configuration, and a graph showing changes in various values calculated in the modification example with respect to a delay time $T_D$.

The computation circuit 12 of the present modification example has a function of performing distance calculation in another procedure as follows. FIG. 10 is a timing chart of various signals handled in the modification example and a graph showing changes in various values calculated in the modification example with respect to a delay time $T_D$. In FIG. 10, parts (a) to (d) illustrate timings of control pulses $G_1$ to $G_3$ and the pulsed light $L_P$, respectively, parts (e) to (in) illustrate values of the first to third detection signals $S_1$ to $S_3$, a value of difference values $S_{1-3}$, an absolute value $|S_{1-3}|$ of the difference value, an absolute value $|S_{1+3}|$ of an addition value, a value of a signal component $S_B$ due to noise, a value of the distance data validity determination signal $S_A$, and the value of the distance calculation reference signal $X_R$ in correspondence with the delay time $T_D$, part (n) illustrates a valid data range in the delay time $T_D$, and part (o) illustrates a measurable range in the delay time $T_D$. FIG. 10 illustrates various signals and values in the subframe period including the emission timing of the pulsed light $L_P$, and illustrates temporal change in signal waveforms and values with the duration $T_P$ of the pulsed light $L_P$ as a unit of time.

First, when a distance image generation process in the distance image sensor 10 of the modification example is started, the light source control means and the charge transfer control means of the computation circuit 12 sets the timings of the control pulses $G_1$ to $G_3$ and the pulsed light $L_P$ within one frame period (pseudo random number generation step, light source control step, and charge transfer control step). Specifically, the control pulses $G_1$ to $G_3$ in each of two subframes within a period of one frame are set to continuous timings so that the control pulses $G_1$ to $G_3$ do not overlap each other in the duration $T_P$. The timings of the control pulses $G_1$ to $G_3$ set in the two subframes are set to the timing of the control pulse $G_1$ and the timing of the control pulse $G_3$ replaced between the two subframes in the one frame. Thereafter, the first to third detection signals $S_1$ to $S_3$ are read out by the signal readout circuit 38 of the computation circuit 12 and passed to the distance calculation means 39 of the computation circuit 12 (signal readout step).

Further, the distance calculation means 39 calculates the distance information for each pixel on the basis of the detection signals $S_1$ to $S_3$ (distance calculation step). That is, the distance calculation means 39 uses Equation (6) below:

$$S_{1-3}=S_1-S_3 \qquad (6)$$

to calculate the difference value $S_{1-3}$ of the detection signals $S_1$ and $S_3$ on the basis of the detection signals $S_1$ and $S_3$, and then calculates an absolute value $|S_{1-3}|$ of the difference value. In addition, the distance calculation means 39 uses Equation (7) below:

$$|S_{1+3}|=|S_1+S_3| \qquad (7)$$

to calculate an absolute value $|S_{1+3}|$ of an addition value of the detection signals $S_1$ and $S_3$, and then obtains a difference between the absolute value $|S_{1+3}|$ of the addition value and the absolute value $|S_{1\text{-}3}|$ of the difference value and uses Equation (8) below:

$$SB=|S_{1+3}|-|S_{1\text{-}3}| \qquad (8)$$

to calculate the value of the signal component $S_B$ due to noise. Further, the distance calculation means 39 uses Equation (9) below:

$$S_A=|S_{1\text{-}3}|+S_2-0.5S_B \qquad (9)$$

to calculate the value of the distance data validity determination signal $S_A$ on the basis of the detection signals $S_1$ to $S_3$ and the value of the signal component $S_B$. The distance calculation means 39 compares the value of the distance data validity determination signal $S_A$ with the threshold value $Th_1$ to determine whether or not the distance calculation using the detection signals $S_1$ to $S_3$ is valid. For example, the threshold value $Th_1$ is set to about "0" so that a range from a value between "−1" and "0" of the delay time $T_D$ to a value between "2" to "3" is determined to be a "valid data range", which is a range in which the calculation of the distance is valid, as illustrated in part (n) of FIG. 10. Further, the distance calculation means 39 calculates a ratio between the value $S_{1\text{-}3}$ of the difference between the detection signals $S_1$ and $S_3$ and the value of the distance data validity determination signal $S_A$, and uses Equation (10) below:

$$X_R=1-S_{1\text{-}3}/S_A \qquad (10)$$

to calculate the value of the distance calculation reference signal $X_R$.

Then, the distance calculation means 39 determines whether or not the value of the distance calculation reference signal $X_R$ is in a predetermined range, thereby determining whether or not the object S is in the measurable range. For example, a determination is made as to whether or not the value of the distance calculation reference signal $X_R$ is "0" or more and the threshold value $Th_2$ or less. Through such a determination, a case in which the object S is too close, the incident pulsed light $L_R$ deviates from a time window of the detection signal $S_2$, and the value of the distance calculation reference signal $X_R$ is saturated, and a case in which the object S is too far, the incident pulsed light $L_R$ deviates from the time window of the detection signal $S_2$, and the distance is not reflected in the value of the distance calculation reference signal $X_R$ can be excluded from the distance calculation. For example, the threshold value $Th_2$ is set to about "2" so that a range from "0" to about "2" of the delay time $T_D$ is determined to be the "measurable range", as illustrated in part (o) of FIG. 10. Finally, when the distance calculation means 39 determines that the range is the "valid data range" and is the "measurable range", distance information indicating a distance of the object S is calculated on the basis of the distance calculation reference signal $X_R$ regarding the pixel and a distance image including the calculated distance information of each pixel is generated and output.

Figure 11A:
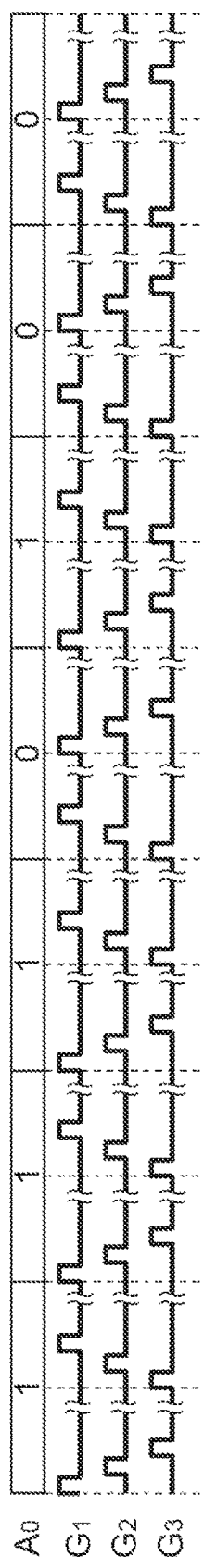
FIGS. 11(a)-11(c) are diagrams illustrating timings of various signals handled in a modification example of a three-tap configuration and changes in values of detection signals detected for each frame period in the modification example.
Figure 11B:
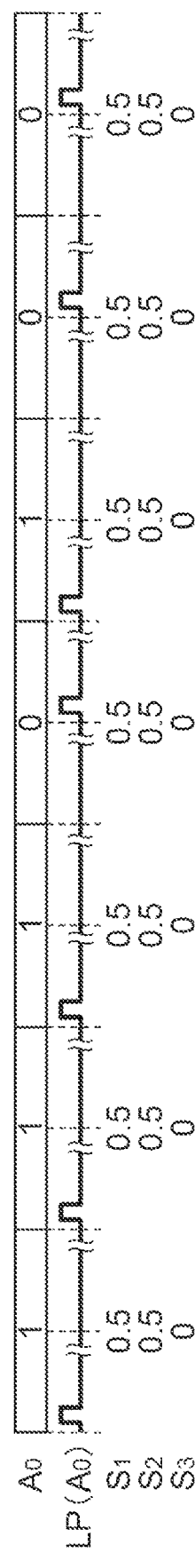
Figure 11C:
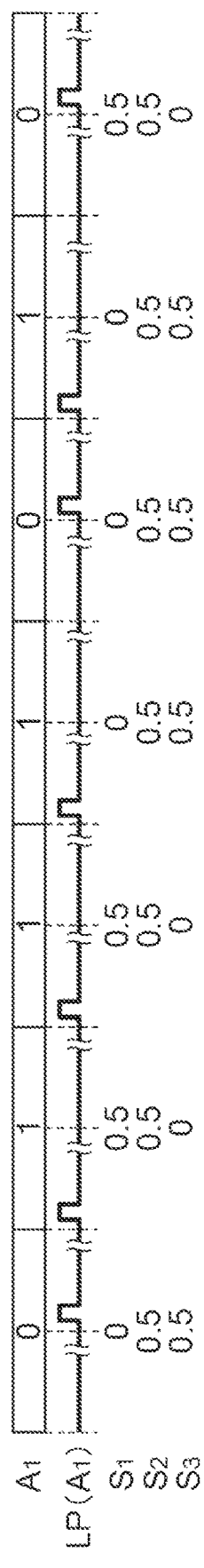

FIGS. 11(*a*)-11(*c*) are diagrams illustrating timings of various signals handled in a modification example of a three-tap configuration and change in values of detection signals detected for each frame period in the modification example. In this case, it is assumed that pulsed light $L_P$ mixed from another distance image sensor at a timing shifted by about one frame period is present in the distance image sensor 10 according to the modification example, and a value of the detection signal in a case in which the object S is present at a position in which reciprocating time of flight (TOF) of the pulsed light $L_P$ is 0.5 $T_P$ is shown. FIG. 11(*a*) illustrates an M sequence $A_0$ generated within the distance image sensor 10 and timings of the first to third control pulses $G_1$ to $G_3$ generated correspondingly, FIG. 11(*b*) illustrates an M sequence $A_0$ generated within the distance image sensor 10, a timing $L_P$ ($A_0$) of the pulsed light $L_P$ correspondingly incident on the distance image sensor 10, and values of the detection signal $S_1$ to $S_3$ generated due to the pulsed light $L_P$, and FIG. 11(*c*) illustrates an M sequence $A_1$ generated within another distance image sensor, a timing $L_P$ ($A_1$) of pulsed light $L_P$ correspondingly mixed from the other distance image sensor, and values of the detection signals $S_1$ to $S_3$ generated due to the pulsed light $L_P$.

Distance calculation results in the distance image sensor 10 in a case in which interference of the pulsed light $L_P$ does not occur and a case in which the interference of the pulsed light $L_P$ occurs were evaluated on the basis of the values of the detection signals $S_1$ to $S_3$ shown in this example. As a result, when Equation (10) above is calculated, the distance calculation reference signal $X_R$ in a case in which the interference of the pulsed light $L_P$ does not occur is calculated using the following equation;

$$X_R=1-3.5/7=0.5,$$

the distance calculation reference signal $X_R$ in a case in which the interference of the pulsed light $L_P$ occurs is calculated using the following equation;

$$X_R=1-3/6=0.5,$$

and in both cases, the same distance calculation results are obtained.

Similarly, the result of the distance calculation in a case in which the object S is present at a position in which the time of flight (TOF) is 1.5 $T_P$ was evaluated, and as a result, it was found that the same calculation result $X_R$=1.5 was obtained in a case in which the interference of the pulsed light $L_P$ does not occur and a case in which the interference of the pulsed light $L_P$ occurs. It was shown from this that, in the modification example of the three-tap configuration, degradation of the distance calculation accuracy due to the interference of the pulsed light $L_P$ is also reduced.

Further, in the distance image sensor 10 according to the above embodiment having a 4-tap configuration, timings and types of the control pulses $G_1$ to $G_4$ applied to the two subframes may be changed, and the periods $T_{C1}$ and $T_{C2}$ of the two subframes may differ. That is, timing are set so that the control pulses $G_1$ to $G_4$ are applied in this order immediately after the application timing of the pulsed light $L_P$ in one subframe period in one frame, and the control pulses $G_3$ and $G_4$ are applied in this order immediately after the application timing of the pulsed light $L_P$ in the other subframe, and the respective timings of the control pulses $G_1$ and $G_2$ within one frame are replaced with the respective timings of the control pulses $G_3$ and $G_4$ according to the M sequence.

FIGS. 12(*a*)-12(*c*) are diagrams illustrating timings of various signals handled in the modification example and change in values of detection signals detected for each frame period in the modification example. In this case, it is also assumed that pulsed light $L_P$ mixed from another distance image sensor at a timing shifted by about one frame period is present in the distance image sensor 10, and a value of the detection signal in a case in which the object S is present at a position in which reciprocating time of flight (TOF) of the pulsed light $L_P$ is 0.5 $T_P$ is shown. FIG. 12(*a*) illustrates an M sequence $A_0$ generated within the distance image sensor 10 and timings of the first to fourth control pulses $G_1$ to $G_4$ generated correspondingly, FIG. 12(b) illustrates an M sequence $A_0$ generated within the distance image sensor 10, a timing $L_P$ ($A_0$) of the pulsed light $L_P$ correspondingly incident on the distance image sensor 10, and values of detection signals $S_1$ to $S_4$ generated due to the pulsed light $L_P$, and FIG. 12(c) illustrates an M sequence $A_1$ generated within another distance image sensor, a timing $L_P$ ($A_1$) of pulsed light $L_P$ correspondingly mixed from the other distance image sensor, and values of detection signals $S_1$ to $S_4$ generated due to the pulsed light $L_P$.

Distance calculation results in the distance image sensor 10 in a case in which interference of the pulsed light $L_P$ does not occur and a case in which the interference of the pulsed light $L_P$ occurs were evaluated on the basis of the values of the detection signals $S_1$ to $S_4$ shown in this example. As a result, when Equation (4) above is calculated, the distance calculation reference signal $X_R$ in a case in which the interference of the pulsed light $L_P$ does not occur is calculated using the following equation;

$$X_R = 1 - 3.5/7 = 0.5,$$

the distance calculation reference signal $X_R$ in a case in which the interference of the pulsed light $L_P$ occurs is calculated using the following equation;

$$X_R = 1 - 3/6 = 0.5,$$

and in both cases, the same distance calculation results are obtained.

Similarly, when a result of the distance calculation in a case in which the object S is present at positions in which the time of flight (TOF) is 1.0 $T_P$ and 1.5 $T_P$ was evaluated, it was found that the same calculation results $X_R = 1.0$ and 1.5 were obtained in a case in which the interference of the pulsed light $L_P$ does not occur and a case in which the interference of the pulsed light $L_P$ occurs. Further, when a result of the distance calculation in a case in which the object S is present at a position in which the time of flight (TOF) is 2.5 $T_P$ was evaluated, it was found that the same calculation results $Y_R = 2.5$ was obtained in a case in which the interference of the pulsed light $L_P$ does not occur and a case in which the interference of the pulsed light $L_P$ occurs. It was shown from this that with the present modification example, degradation of distance calculation accuracy due to the interference of the pulsed light $L_P$ is also reduced.

Next, a function of the modification example having a 8-tap configuration will be described.

The charge transfer control means of the computation circuit 12 according to the modification example having the 8-tap configuration has a function of controlling the timings of the first to eighth control pulses $G_1$ to $G_8$ within a period of one frame. Specifically, the control pulses $G_1$ to $G_8$ in each of two subframes within a period of one frame are set to continuous timings so that the control pulses do not overlap each other in the duration $T_P$. The timings of the control pulses $G_1$ to $G_8$ set in the two subframes are set to the respective timings of the control pulses $G_1$, $G_2$, $G_5$, and $G_6$ and the respective timings of the control pulses $G_3$, $G_4$, $G_7$, and $G_8$ replaced between the two subframes in the one frame. That is, the charge transfer control means sets two control pulses corresponding to the amount of charge that is the basis of the difference value used for the distance calculation in the distance calculation means 39 so that two control pulses are replaced with each other.

Figure 13:
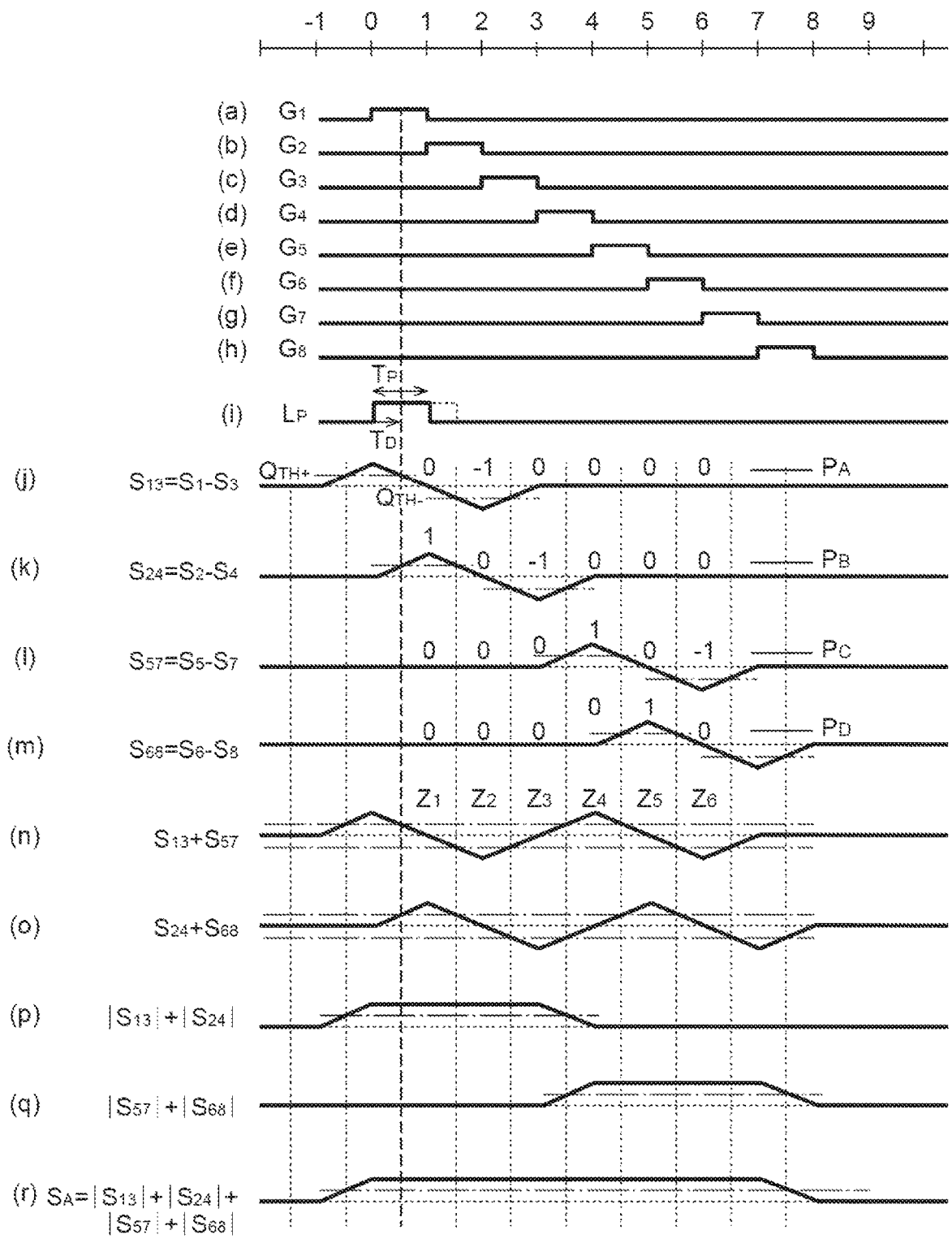
FIG. 13 is a timing chart of various signals handled in a modification example of an 8-tap configuration, and a graph showing changes in various values calculated in the modification example with respect to the delay time $T_D$.
Figure 14:
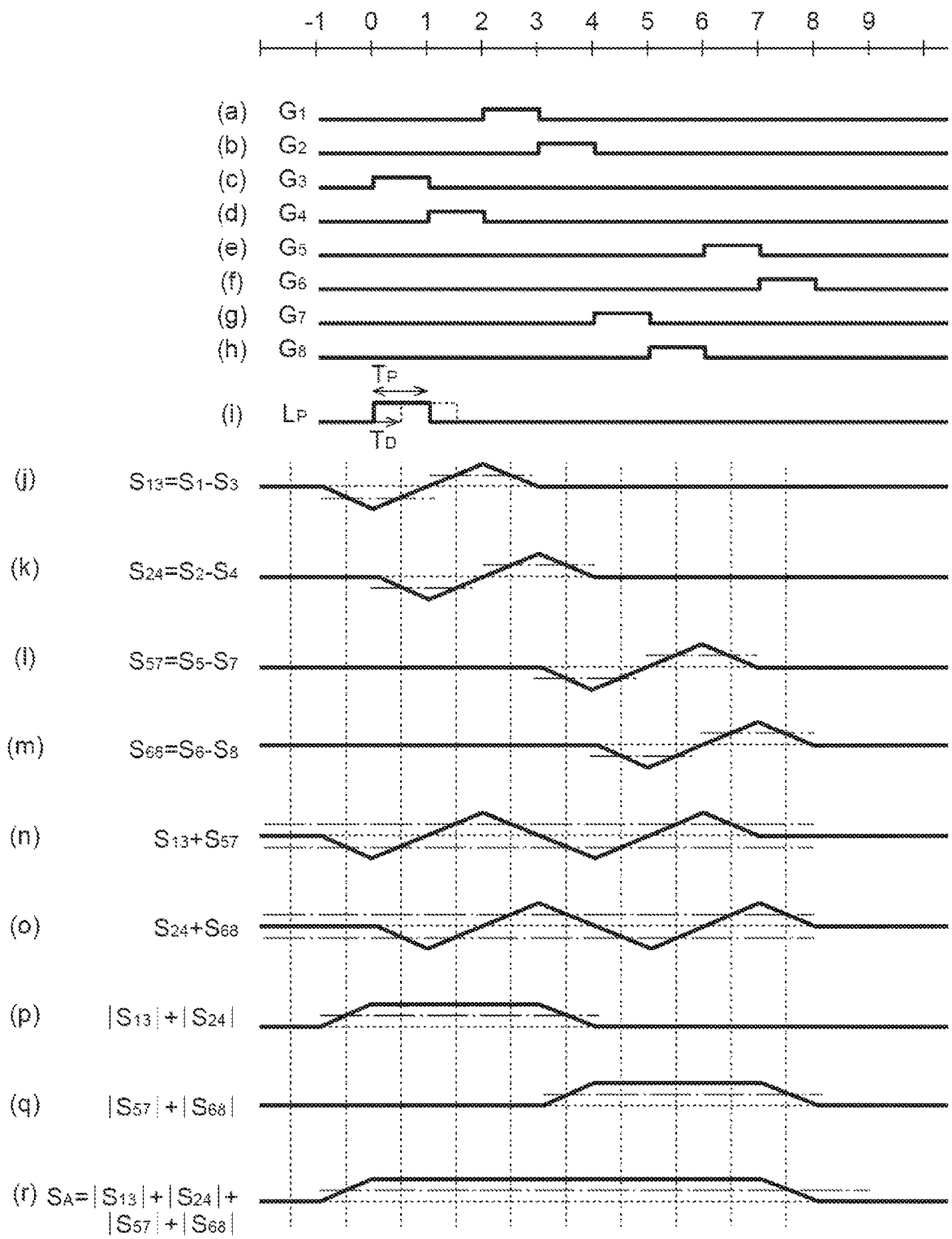
FIG. 14 is a timing chart of various signals handled in a modification example of an 8-tap configuration, and a graph showing changes in various values calculated in the modification example with respect to the delay time $T_D$.

FIGS. 13 and 14 illustrate a timing chart of various signals generated in the present modification example in each of the two subframes and changes in various values calculated in the present modification example with respect to the delay time $T_D$, respectively. In FIG. 10, parts (a) to (i) illustrate timings of the control pulses $G_1$ to $G_8$ and the pulsed light $L_P$, respectively, and parts (j) to (r) illustrate values of difference values $S_{13} = S_1 - S_3$, $S_{24} = S_2 - S_4$, $S_{57} = S_5 - S_7$, and $S_{68} = S_6 - S_8$, addition values $S_{13} + S_{57}$ and $S_{24} + S_{68}$, an addition value of absolute addition values $|S_{13}| + |S_{24}|$ and $|S_{57}| + |S_{68}|$, and the values of the distance data validity determination signal $S_A$ in correspondence with the delay time $T_D$, respectively.

When the distance calculation means 39 in the modification example calculates the distance information for each pixel on the basis of the detection signals $S_1$ to $S_8$, the distance calculation means 39 compares each of calculated difference values $S_{13}$, $S_{24}$, $S_{57}$, and $S_{68}$ with preset threshold values $Q_{TH+}$ and $Q_{TH-}$ to generate identification patterns ($P_A$, $P_B$, $P_C$, $P_D$), and discriminates a zone in which the object S is positioned from six zones $Z_1$ to $Z_6$ on the basis of the identification pattern ($P_A$, $P_B$, $P_C$, $P_D$). The distance calculation means 39 selects and uses a calculation equation corresponding to the discriminated zones $Z_1$ to $Z_6$ from the following calculation equations to calculate the distance information L (c indicates a speed of light).

| | |
|---|---|
| $L = (\frac{1}{2})cT_P\{-(Q_{13} + Q_{57})/S_A + 1\},$ | Zone $Z_1$: |
| $L = (\frac{1}{2})cT_P\{-(Q_{24} + Q_{68})/S_A + 2\},$ | Zone $Z_2$: |
| $L = (\frac{1}{2})cT_P\{(Q_{13} + Q_{57})/S_A + 3\},$ | Zone $Z_3$: |
| $L = (\frac{1}{2})cT_P\{(Q_{24} + Q_{68})/S_A + 4\},$ | Zone $Z_4$: |
| $L = (\frac{1}{2})cT_P\{-(Q_{13} + Q_{57})/S_A + 5\},$ and | Zone $Z_5$: |
| $L = (\frac{1}{2})cT_P\{-(Q_{24} + Q_{68})/S_A + 6\}$ | Zone $Z_6$: |

Here, assuming that the object S is present at a position in which the time of flight (TOF) is 0. $T_P$, results of distance calculation according to the present modification example in a case in which interference of the pulsed light $L_P$ does not occur and a case in which the interference of the pulsed light $L_P$ occurs were evaluated. When the distance information was calculated using a calculation equation corresponding to the zone $Z_1$, the distance information L in a case in which the interference of the pulsed light $L_P$ did not occur and the distance information L in a case in which the interference of the pulsed light $L_P$ occurs were both calculated as $$L = (\frac{1}{2})cT_P \times 0.5,$$

and in both cases, the same distance calculation result was obtained.

Similarly, when a result of the distance calculation in a case in which the object S is present at a position in which the time of flight (TOF) is 1.0 $T_P$ was evaluated using the calculation equation corresponding to the zone $Z_1$, it was found that the same distance information $L = (\frac{1}{2})cT_P \times 1.0$ can be obtained in a case in which interference of the pulsed light $L_P$ does not occur and a case in which interference of the pulsed light $L_P$ occurs. Further, when a result of the distance calculation in a case in which the object S is present at a position in which the time of flight (TOF) is 1.5 $T_P$ and 2.0 $T_P$ was evaluated using a calculation equation corresponding to the zone $Z_2$, it was found that the same distance information $L = (\frac{1}{2})cT_P \times 1.5$ and $L = (\frac{1}{2})cT_P \times 2.0$ can be obtained in a case in which interference of the pulsed light $L_P$ does not occur and a case in which interference of the pulsed light $L_P$ occurs. Further, when a result of the distance calculation in a case in which the object S is present at a position in which the time of flight (TOF) is 6.0 $T_P$ and 6.5 $T_P$ was evaluated using a calculation equation corresponding to the zone $Z_6$, it was found that the same distance information $L=(\frac{1}{2})cT_P \times 6.0$ and $L=(\frac{1}{2})cT_P \times 6.5$ can be obtained in a case in which interference of the pulsed light $L_P$ does not occur and a case in which interference of the pulsed light $L_p$ occurs. It was shown from this that with the present modification example, degradation of distance calculation accuracy due to the interference of the pulsed light $L_P$ is also reduced.

Here, according to the above-described embodiment and modification example, it was shown that an error in the distance calculation can be reduced even when the pulsed light $L_P$ has interfered. In addition, with the above-described embodiment and modification example, it is possible to prevent erroneous distance information from being acquired even when light from another distance image sensor disposed nearby has been directly received.

That is, although the object S does not exist in the measurable range due to, for example, a situation in which the object S is present in the distance, a situation in which the pulsed light $L_P$ from another distance image sensor is directly incident on the photoelectric conversion region 21 of the distance image sensor 10 having a 4-tap configuration is assumed. Even under such a situation, the distance calculation means 39 of the distance image sensor 10 compares the threshold value $Th_1$ set to an appropriate value in advance with the value of the distance data validity determination signal $S_A$, thereby making it possible to determine that the distance calculation using the detection signals $S_1$ to $S_4$ is invalid and prevent generation of erroneous distance information.

FIGS. 15(a)-15(c) are diagrams illustrating timings of various signals handled by the computation circuit 12 of the distance image sensor 10 and changes in values of detection signals detected for each frame period by the computation circuit 12. In this case, it is assumed that pulsed light $L_P$ directly incident from another distance image sensor present at a position in which a time of flight of the pulsed light $L_P$ is 0.5 $T_P$ at a timing shifted by about one frame period is present in the distance image sensor 10, and the value of the detection signal in a case in which reflected light of the pulsed light $L_P$ from the object S is not incident is shown. FIG. 15(a) illustrates an M sequence $A_0$ generated within the distance image sensor 10 and timings of the first to fourth control pulses $G_1$ to $G_4$ generated correspondingly, FIG. 15(b) illustrates an M sequence $A_0$ generated within the distance image sensor 10, a timing $L_P$ ($A_0$) of the pulsed light $L_P$ correspondingly incident on the distance image sensor 10, and values of detection signals $S_1$ to $S_4$ generated due to the pulsed light $L_P$, and FIG. 15(c) illustrates an M sequence $A_1$ generated within another distance image sensor, a timing $L_P$ ($A_1$) of pulsed light $L_P$ correspondingly mixed from the other distance image sensor, and values of detection signals $S_1$ to $S_4$ generated due to the pulsed light $L_P$.

In the above example, the distance calculation means 39 calculates the distance data validity determination signal $S_A$ as $S_A$=0.5+0.5=1.0 and sets set the threshold value $Th_1$ to 1.0 or more, thereby determining that the distance calculation is invalid. As a result, it is possible to prevent the generation of erroneous distance information.

Here, in the above embodiment, it is preferable that the pseudo random number generation means generates the PN sequence, the light source control means changes the generation timing of the pulsed light between the first timing and the second timing within the frame period according to the value of the PN sequence, and the charge transfer control means replaces the control pulse applied immediately after the first timing among the first to M-th control pulses with the control pulse applied immediately after the second timing among the first to M-th control pulses according to the value of the PN sequence. With this configuration, even when a plurality of distance image measurement devices execute simultaneous measurement to generate pulsed light, it is possible to offset an influence of pulsed light mixed from an external distance image measurement device on a difference value between two amounts of charge. As a result, even when a plurality of distance image measurement devices execute simultaneous measurement, it is possible to further reduce an error of the distance calculation due to the presence of mixed pulsed light.

Further, it is preferable that the light source control means changes the generation timing of the pulsed light between within the first subframe in the frame period and within the second subframe in the frame period according to the value of the PN sequence, and the charge transfer control means replaces the order of the control pulses applied within the first subframe among the first to M-th control pulses with the order of the control pulses applied in the second subframe among the first to M-th control pulses according to the value of the PN sequence. In this case, even when a plurality of distance image measurement devices execute simultaneous measurement to generate pulsed light, it is possible to offset an influence of pulsed light mixed from an external distance image measurement device on a difference value between two amounts of charge. As a result, even when a plurality of distance image measurement devices execute simultaneous measurement, it is possible to further reduce an error of the distance calculation due to the presence of mixed pulsed light.

Further, it is also preferable that the pseudo random number generation means generates the M sequence. With such a configuration, it is possible to easily generate a PN sequence having high uniformity, and to reduce an error of the distance calculation due to the presence of mixed pulsed light using a simple configuration.

Further, it is preferable that the pixel circuit units are arranged in a two-dimensional array on a semiconductor chip, and the light source control means, the charge transfer control means, the signal readout means, and the pseudo random number generation means are configured on the semiconductor chip. In this case, it is possible to easily realize miniaturization of an entire device.

INDUSTRIAL APPLICABILITY

In one aspect of the present invention, the distance image measurement device, the distance image measurement system, and the distance image measurement method are used as applications, and it is possible to sufficiently improve the measurement accuracy in a case in which a plurality of devices are used at the same time.

REFERENCE SIGNS LIST

10 Distance image sensor
$L_P$ Pulsed light
$L_R$ Incident pulsed light
S Object
$22_1$ to $22_4$ Charge readout region
$24_1$ to $24_4$ Control electrode
$26_1$ to $26_4$ Voltage detection means
11 Light source
12 Computation circuit
13 Pixel circuit (pixel circuit unit)
21 Photoelectric conversion region 31 Light source driver
32 Pixel driver
33 Pulse pattern generation circuit
34 Pulse generation circuit
35 Pseudo random number generation circuit
36 Gating circuit
37 Gating circuit
38 Signal readout circuit (signal readout means)
39 Distance calculation means

The invention claimed is:

1. A distance image measurement device comprising:
a light source configured to generate pulsed light;
a light source controller configured to control the light source so that the pulsed light is repeatedly generated within a periodic frame period;
a pixel circuit unit including a photoelectric conversion region configured to convert light into charge, first to M-th charge readout regions (M is an integer equal to or greater than 2) provided to be close to the photoelectric conversion region and separated from each other, and first to M-th control electrodes provided in correspondence with the photoelectric conversion region and the first to M-th charge readout regions and for applying first to M-th control pulses for charge transfer between the photoelectric conversion region and the first to M-th charge readout regions;
a charge transfer controller configured to sequentially apply the first to M-th control pulses to the first to M-th control electrodes within the frame period in correspondence with the generation of the pulsed light by the light source controller;
a circuitry configured to read out a detection signal according to first to M-th amounts of charge, the first to M-th amounts of charge transferred to the first to M-th charge readout regions of the pixel circuit unit according to the application of the first to M-th control pulses by the charge transfer controller, and configured to repeatedly calculate a distance from a difference value between two of the first to M-th amounts of charge on the basis of the detection signal; and
a pseudo random number generator configured to generate a pseudo random number,
wherein the light source controller changes a timing of the pulsed light according to the pseudo random number, and
the charge transfer controller replaces timing of application of one of two control pulses for transferring charge corresponding to the two amounts of charge among timings of application of the first to M-th control pulses with timing of application of the other one of the two control pulses according to the pseudo random number, to thereby offset an influence of pulsed light mixed from the outside on a difference value of the two amounts of charge,
wherein the pseudo random number generator generates a PN sequence,
the light source controller controls so that a timing of the pulsed light is changed to a first timing within a first subframe in the frame period or a second timing within a second subframe in the frame period according to the value of the PN sequence, and
the charge transfer controller replaces an order of control pulses applied within the first subframe among the first to M-th control pulses with an order of control pulses applied within the second subframe among the first to M-th control pulses according to the value of the PN sequence.

2. The distance image measurement device according to claim 1, wherein
the charge transfer controller replaces a control pulse applied immediately after the first timing among the first to M-th control pulses with a control pulse applied immediately after the second timing among the first to M-th control pulses according to the value of the PN sequence.

3. The distance image measurement device according to claim 1, wherein the pseudo random number generator generates an M sequence.

4. The distance image measurement device according to claim 1,
wherein the pixel circuit units are arranged in a two-dimensional array on a semiconductor chip, and
the light source controller, the charge transfer controller, the circuitry, and the pseudo random number generator are configured on the semiconductor chip.

5. A distance image measurement system comprising:
a plurality of distance image measurement devices according to claim 1,
wherein each of the plurality of distance image measurement devices has a periodic frame period, and the periodic frame periods of the plurality of distance measurement devices are set to be the same.

6. A distance image measurement method comprising:
controlling, by a light source controller, a light source so that pulsed light is repeatedly generated within a periodic frame period;
using a pixel circuit unit including a photoelectric conversion region configured to convert light into charge, first to M-th charge readout regions (M is an integer equal to or greater than 2) provided to be close to the photoelectric conversion region and separated from each other, and first to M-th control electrodes provided in correspondence with the photoelectric conversion region and the first to M-th charge readout regions and for applying first to M-th control pulses for charge transfer between the photoelectric conversion region and the first to M-th charge readout regions, and sequentially applying, by a charge transfer controller, the first to M-th control pulses to the first to M-th control electrodes within the frame period in correspondence with the generation of the pulsed light by the light source controller;
reading out, by a circuitry, a detection signal according to first to M-th amounts of charge, the first to M-th amounts of charge transferred to the first to M-th charge readout regions of the pixel circuit unit according to the application of the first to M-th control pulses by the charge transfer controller;
repeatedly calculating, by the circuitry, a distance from a difference value between two of the first to M-th amounts of charge on the basis of the detection signal; and
generating a pseudo random number by a pseudo random number generator,
wherein controlling of the light source includes changing timing of the pulsed light according to the pseudo random number, and
applying of the control pulses includes replacing timing of application one of two control pulses for transferring charge corresponding to the two amounts of charge among timings of application of the first to M-th control pulses with timing of application of the other one of the two control pulses according to the pseudo random number, to thereby offset an influence of pulsed light mixed from the outside on a difference value of the two amounts of charge, wherein the pseudo random number generator generates a PN sequence, the light source controller controls so that a timing of the pulsed light is changed to a first timing within a first subframe in the frame period or a second timing within a second subframe in the frame period according to the value of the PN sequence, and the charge transfer controller replaces an order of control pulses applied within the first subframe among the first to M-th control pulses with an order of control pulses applied within the second subframe among the first to M-th control pulses according to the value of the PN sequence.

7. The distance image measurement method according to claim 6, wherein the charge transfer controller replaces a control pulse applied immediately after the first timing among the first to M-th control pulses with a control pulse applied immediately after the second timing among the first to M-th control pulses according to the value of the PN sequence.

8. The distance image measurement method according to claim 6, wherein the pseudo random number generator generates a M sequence.

* * * * *